US012784154B2

(12) United States Patent
Ueno et al.

(10) Patent No.: US 12,784,154 B2
(45) Date of Patent: Nov. 3, 2026

(54) ELECTRONIC DEVICE, DISPLAY CONTROL DEVICE, CONTROL METHOD OF ELECTRONIC DEVICE, AND NON-TRANSITORY COMPUTER READABLE MEDIUM

(71) Applicant: CANON KABUSHIKI KAISHA, Tokyo (JP)

(72) Inventors: Daiyu Ueno, Tokyo (JP); Takuma Fujiwara, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 239 days.

(21) Appl. No.: 18/637,734

(22) Filed: Apr. 17, 2024

(65) Prior Publication Data

US 2024/0378707 A1 Nov. 14, 2024

(30) Foreign Application Priority Data

May 8, 2023 (JP) ................................ 2023-076793

(51) Int. Cl.

| | |
|---|---|
| ***G06K 9/00*** | (2022.01) |
| ***G06T 5/70*** | (2024.01) |
| ***G06T 7/20*** | (2017.01) |
| ***G06T 7/60*** | (2017.01) |
| ***G06T 7/70*** | (2017.01) |

(52) U.S. Cl.
CPC .................. *G06T 5/70* (2024.01); *G06T 7/20* (2013.01); *G06T 7/60* (2013.01); *G06T 7/70* (2017.01)

(58) Field of Classification Search
CPC .... G06T 5/70; G06T 7/20; G06T 7/60; G06T 7/70; G06T 2200/24; G06T 2207/20104; G06F 21/84
See application file for complete search history.

(56) References Cited

U.S. PATENT DOCUMENTS

| | | | | |
|---|---|---|---|---|
| 11,539,879 | B2 | 12/2022 | Harada | |
| 12,444,072 | B1 * | 10/2025 | Niu | G06T 7/20 |
| 2013/0329068 | A1 * | 12/2013 | Hamanaka | H04N 23/631 348/218.1 |
| 2015/0163397 | A1 * | 6/2015 | Inoue | H04N 23/741 348/333.02 |
| 2020/0213575 | A1 * | 7/2020 | Shibagami | H04N 13/398 |
| 2021/0018754 | A1 * | 1/2021 | Peuhkurinen | G06F 3/013 |
| 2021/0349677 | A1 * | 11/2021 | Baldev | G06F 3/011 |
| 2021/0374275 | A1 * | 12/2021 | Singh | G06F 16/538 |
| 2023/0245337 | A1 * | 8/2023 | Lee | G06V 10/255 382/103 |
| 2023/0342888 | A1 * | 10/2023 | Yuan | G06T 5/70 |

FOREIGN PATENT DOCUMENTS

| | | |
|---|---|---|
| JP | 2009-094946 A | 4/2009 |
| JP | 2017-022742 A | 1/2017 |

* cited by examiner

*Primary Examiner* — Gregory A Morse
*Assistant Examiner* — Owais I Memon
(74) *Attorney, Agent, or Firm* — Venable LLP

(57) ABSTRACT

An electronic device according to the present invention, includes: a processor; and a memory storing a program which, when executed by the processor, causes the electronic device to obtain an image, detect a specific object from the image, determine a range corresponding to an angle of view including the detected specific object in the image, and selectively execute either of setting processing for hiding the range of the image and setting processing for performing image processing to reduce visibility of the range of the image, depending on a state of the specific object.

17 Claims, 9 Drawing Sheets

ELECTRONIC DEVICE, DISPLAY CONTROL DEVICE, CONTROL METHOD OF ELECTRONIC DEVICE, AND NON-TRANSITORY COMPUTER READABLE MEDIUM

BACKGROUND OF THE INVENTION

Field of the Invention

The present invention relates to an electronic device, a display control device, a control method of an electronic device, and a non-transitory computer-readable medium, and particularly to a control method for displaying an image having a wide image range.

Description of the Related Art

Recent years have seen the widespread use of image capturing devices that are capable of capturing wide-range images showing ranges wider than the view angle of a person, such as omnidirectional images and full spherical images. Also, methods for distributing (e.g., live streaming) such wide-range images to many and unspecified viewers are known.

When wide-range images are distributed, an object may be unexpectedly displayed on the viewer's side against the intention of the person who captured (distributed) the images. For example, when the face of a third party is displayed, this may result in the infringement of portrait rights, and when someone's works included in an advertisement exhibited on the street are displayed, this may result in the infringement of copyright.

Japanese Patent Application Publication Nos. 2009-094946 and 2017-022742 disclose technologies for hiding an object included in an image against the intention of the person who captured the image through blurring or pixelation, for example.

However, the technologies disclosed in Japanese Patent Application Publication Nos. 2009-094946 and 2017-022742 for hiding an object through blurring, pixelation, or the like may fail to sufficiently hide the object (the object may be visible).

SUMMARY OF THE INVENTION

The present invention provides a technology for sufficiently hiding an object (making the object invisible).

An electronic device according to the present invention, includes: a processor; and a memory storing a program which, when executed by the processor, causes the electronic device to obtain an image, detect a specific object from the image, determine a range corresponding to an angle of view including the detected specific object in the image, and selectively execute either of setting processing for hiding the range of the image and setting processing for performing image processing to reduce visibility of the range of the image, depending on a state of the specific object.

Further features of the present invention will become apparent from the following description of exemplary embodiments with reference to the attached drawings.

DESCRIPTION OF THE EMBODIMENTS

Figure 1A:
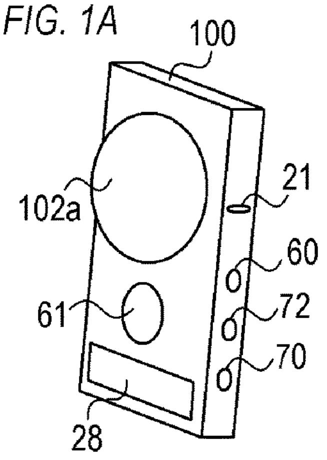
FIGS. 1A and 1B are external views of a digital camera.
Figure 1B:
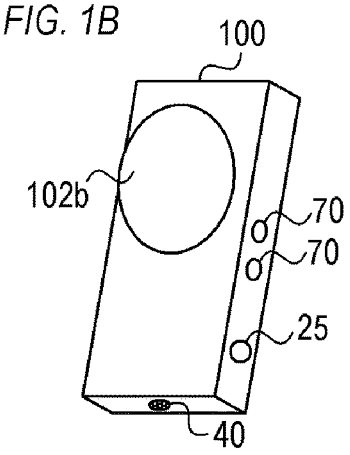

The following describes an embodiment of the present invention with reference to the drawings. FIG. 1A is a front perspective view (external view) of a digital camera 100 (image capturing device), which is a type of electronic device to which the present invention is applied. FIG. 1B is a rear perspective view (external view) of the digital camera 100. The digital camera 100 is an omnidirectional camera (360-degree camera).

A barrier 102*a* is a protective window for a front camera unit that captures images of a range in front of the digital camera 100. The front camera unit is a wide-angle camera unit whose image capturing range is a wide range in front of the digital camera 100 having an angle of 180° or more in the up-down direction and the left-right direction, for example. A barrier 102*b* is a protective window for a rear camera unit that captures images of a range in the rear of the digital camera 100. The rear camera unit is a wide-angle camera unit whose image capturing range is a wide range in the rear of the digital camera 100 having an angle of 180° or more in the up-down direction and the left-right direction, for example.

A display unit 28 displays various types of information. A shutter button 61 is an operation unit (operation member) for giving an image capturing instruction. A mode switching switch 60 is an operation unit for switching various modes. A connection I/F 25 is a connector for connecting a connection cable to the digital camera 100, and an external device such as a smartphone, a personal computer, or a television is connected to the digital camera 100 via the connection cable. Operation units 70 are various types of switches, buttons, dials, touch sensors, etc., that accept various operations made by a user. A power switch 72 is a push button for switching a power source on and off.

A light-emitting unit 21 is a light-emitting member such as a light emitting diode (LED), and notifies the user of various states of the digital camera 100 by changing light-emitting patterns or the color of emitted light. A fixing part 40 is a threaded hole for a tripod, for example, and is used to fix the digital camera 100 with a fixing device such as a tripod.

Figure 1C:
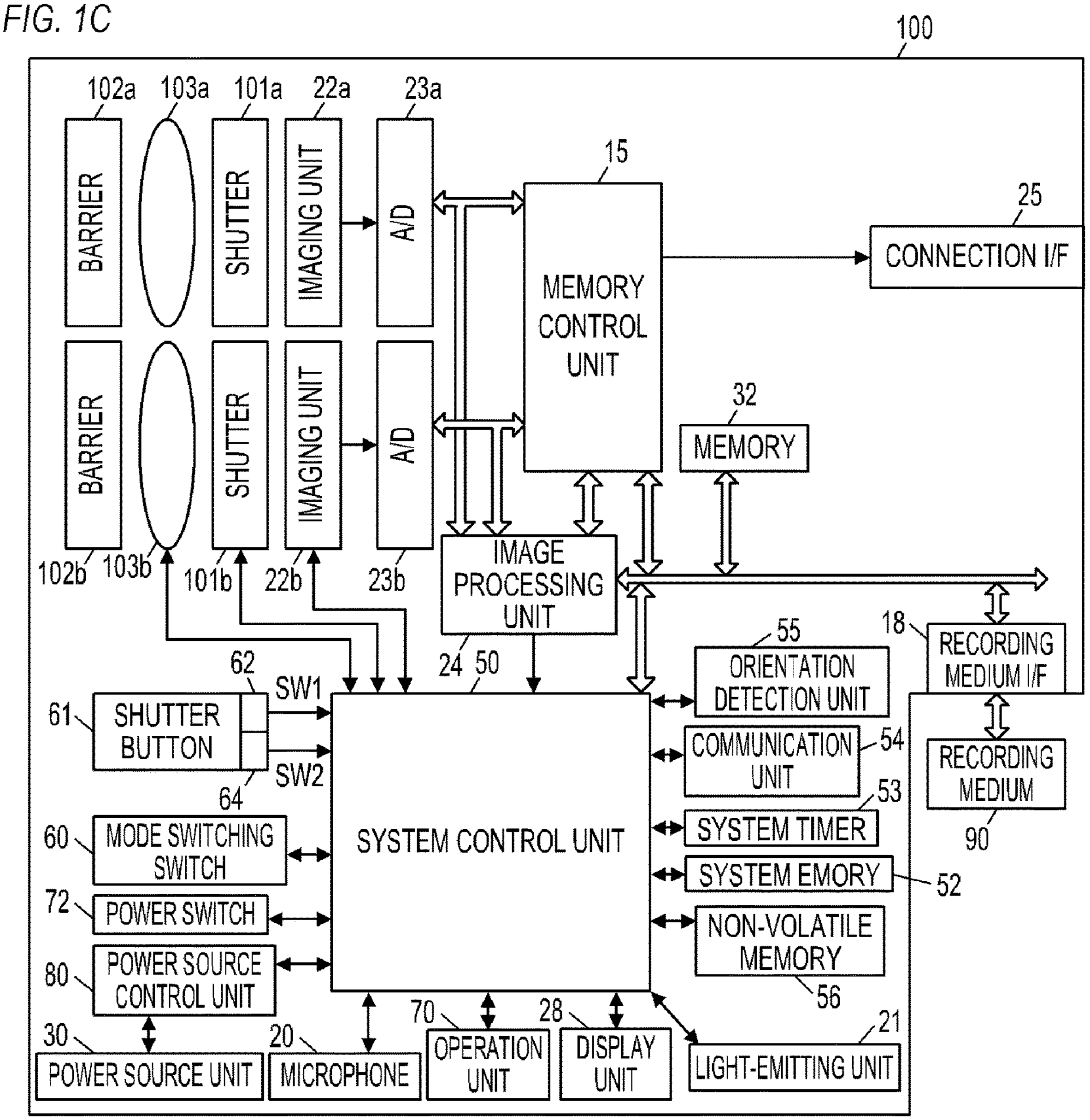
FIG. 1C is a block diagram of the digital camera.

FIG. 1C is a block diagram showing a configuration example of the digital camera 100.

The barrier 102*a* covers an image capturing system (a taking lens 103*a*, a shutter 101*a*, an imaging unit 22*a*, etc.) of the front camera unit to prevent the image capturing system from being soiled or damaged. The taking lens 103*a* is a group of lenses including a zoom lens and a focusing lens, and is a wide-angle lens. The shutter 101*a* has an aperture function for adjusting the amount of light from an object incident on the imaging unit 22*a*. The imaging unit 22*a* is an imaging element (imaging sensor) constituted by a CCD, a CMOS element, or the like that converts an optical image to an electrical signal. An A/D converter 23*a* converts an analog signal output from the imaging unit 22*a* to a digital signal. Note that a configuration is also possible in which the barrier 102*a* is not provided, an outer surface of the taking lens 103*a* is exposed, and the taking lens 103*a* prevents the other elements of the image capturing system (the shutter 101*a* and the imaging unit 22*a*) from being soiled or damaged.

The barrier 102*b* covers an image capturing system (a taking lens 103*b*, a shutter 101*b*, an imaging unit 22*b*, etc.) of the rear camera unit to prevent the image capturing system from being soiled or damaged. The taking lens 103*b* is a group of lenses including a zoom lens and a focusing lens, and is a wide-angle lens. The shutter 101*b* has an aperture function for adjusting the amount of light from an object incident on the imaging unit 22*b*. The imaging unit 22*b* is an imaging element constituted by a CCD, a CMOS element, or the like that converts an optical image to an electrical signal. An A/D converter 23*b* converts an analog signal output from the imaging unit 22*b* to a digital signal. Note that a configuration is also possible in which the barrier 102*b* is not provided, an outer surface of the taking lens 103*b* is exposed, and the taking lens 103*b* prevents the other elements of the image capturing system (the shutter 101*b* and the imaging unit 22*b*) from being soiled or damaged.

VR (Virtual Reality) images are captured by the imaging unit 22*a* and the imaging unit 22*b*. VR images are images for which VR displaying can be performed (i.e., images that can be displayed in a "VR view" display mode). VR images include omnidirectional images (full spherical images) captured by an omnidirectional camera (360-degree camera) and panoramic images having an image range (effective image range) wider than a display range that can be displayed at the same time in a display unit. VR images include not only still images but also moving images and live view images (images obtained from a camera approximately in real time). A VR image has an image range (effective image range) corresponding to a field of view having an angle (vertical angle, angle from the zenith, elevation angle, angle of depression, angle of altitude, pitch angle) up to 360° in the up-down direction and an angle (horizontal angle, azimuth angle, yaw angle) up to 360° in the left-right direction.

Also, VR images include images that have a wider angle of view (field of view) than images that can be captured by common cameras, even if the angle is less than 360° in the up-down direction or in the left-right direction, and images that have an image range (effective image range) wider than a display range that can be displayed at the same time in the display unit. For example, an image captured by a 360-degree camera that can take an image of an object in a field of view (angle of view) corresponding to 360° (horizontal angle, azimuth angle) in the left-right direction and a vertical angle of 210°, of which the center is the zenith, is a type of VR images. Also, an image captured by a camera that can take an image of an object in a field of view (angle of view) corresponding to 180° (horizontal angle, azimuth angle) in the left-right direction and a vertical angle of 180°, of which the center is in the horizontal direction, is a type of VR images. That is, an image having an image range that is wider than a range that can be seen by a person at the same time and corresponds to a field of view having an angle of at least 160°(±80°) in each of the up-down direction and the left-right direction is a type of VR images.

When VR displaying of a VR image is performed (i.e., the image is displayed in the "VR view" display mode), it is possible to view an omnidirectional image that is seamless in the left-right direction (horizontal rotation direction) by changing the orientation of a display device (display device displaying the VR image) in the left-right rotation direction. In the up-down direction (vertical rotation direction), it is possible to view an omnidirectional image that is seamless within a range of ±105° from right overhead (the zenith), but a range having an angle more than 105° from right overhead is a blank region for which there is no image. VR images can also be said as "images whose image range is at least a portion of a virtual space (VR space)".

VR displaying (VR view) is a display method (display mode) that makes it possible to change a displayed range of a VR image and display an image of a field of view corresponding to the orientation of the display device. When a user views a VR image by wearing a head-mounted display (HMD), which is a display device, an image of a field of view corresponding to the direction of the face of the user is displayed. For example, it is assumed that a range of a VR image corresponding to a view angle (angle of view) of which the center is at 0° (a particular direction, e.g., north) in the left-right direction and 90° in the up-down direction (90° from the zenith, i.e., the horizon) is displayed at a point in time. When front and back of the display device are reversed from this state (e.g., the orientation of a display surface is changed from south to north), the displayed range of the same VR image changes to a range corresponding to a view angle of which the center is at 180° (opposite direction, e.g., south) in the left-right direction and 90° (the horizon) in the up-down direction. In the case where the user is viewing the VR image using an HMD, the image displayed on the HMD changes from an image of the north to an image of the south when the user changes the direction of his face from north to south (i.e., looks back). VR displaying described above can make the user feel as if he was present in the VR image (VR space) (i.e., feel the sense of immersion). A smartphone attached to VR goggles (head-mounted adapter) can be said as a type of HMD.

Note that there is no limitation to the above-described method for displaying VR images. A displayed range may also be moved (scrolled) in response to an operation made by the user on a touch panel, a direction button, or the like, rather than an orientation change. A configuration is also possible in which a displayed range can be changed during VR displaying (in the "VR view" display mode) in response to a touch panel being touched, a mouse or the like being dragged, or a direction button being pressed, for example, as well as an orientation change.

An image processing unit 24 performs predetermined resizing processing, such as pixel interpolation and scaling down, and color conversion processing on data obtained from the A/D converter 23*a* and the A/D converter 23*b* or data obtained from a memory control unit 15. Also, the image processing unit 24 performs predetermined computation processing using image data obtained by capturing images. A system control unit 50 performs exposure control and distance measurement control based on computation results obtained by the image processing unit 24. Thus, AF (Auto Focusing) processing, AE (Automatic Exposure) processing, EF (pre-flashing) processing, etc., of the TTL (Through the Lens) method are performed. Furthermore, the image processing unit 24 performs predetermined computation processing using image data obtained by capturing images, and performs AWB (Automatic White Balance) processing of the TTL method based on the obtained computation results. Also, the image processing unit 24 performs basic image processing on two images (two fish-eye images; two wide-angle images) obtained from the A/D converter 23*a* and the A/D converter 23*b*, and performs image connecting processing for compositing the two images subjected to the basic image processing to generate a single VR image. Also, when live viewing or reproduction of a VR image is to be performed, the image processing unit 24 performs image segmentation processing, magnification processing, distortion correction, etc., to perform VR displaying of the VR image, and performs rendering to draw the result of processing in VRAM of a memory 32.

In the image connecting processing, the image processing unit 24 uses one of the two images as a reference image and the other as a comparative image, calculates a shift amount between the reference image and the comparative image for each area through pattern matching processing, and detects connecting positions at which the two images are to be connected on the basis of the shift amount of each area. The image processing unit 24 corrects distortion of each image through geometric transformation, giving consideration to the detected connecting points and lens characteristics of each optical system, and converts each image to an image of a full spherical form (full spherical image form). Then, the image processing unit 24 composites (blends) the two full spherical form images to generate a single full spherical image (VR image). The generated full spherical image is an image obtained by means of equidistant cylindrical projection, for example, and the position of each pixel in the full spherical image can be associated with coordinates on a surface of a sphere (VR space).

Data output from the A/D converters 23*a* and 23*b* is written into the memory 32 via the image processing unit 24 and the memory control unit 15 or via the memory control unit 15 and not via the image processing unit 24. Image data that is obtained by the imaging units 22*a* and 22*b* and converted to digital data by the A/D converters 23*a* and 23*b* and image data that is to be output from the connection I/F 25 to an external display are stored in the memory 32. The memory 32 has a storage capacity large enough to store a predetermined number of still images and moving images and audio corresponding to a predetermined period of time.

The memory 32 also serves as a memory (video memory) for displaying images. Data stored in the memory 32 to display images can be output from the connection I/F 25 to the external display. VR images that are captured by the imaging units 22*a* and 22*b*, generated by the image processing unit 24, and accumulated in the memory 32 are successively transferred to the external display and displayed. Thus, functions of an electronic viewfinder can be realized and live view displaying (LV displaying) can be performed. Hereinafter, images displayed by live view displaying will be referred to as live view images (LV images). Live view displaying (remote LV displaying) can also be performed by transferring VR images accumulated in the memory 32 to an external device (e.g., a smartphone) wirelessly connected via a communication unit 54, and displaying the images in the external device.

A non-volatile memory 56 is an electrically erasable and recordable recording medium such as an EEPROM. For example, constants and programs for operating the system control unit 50 are recorded in the non-volatile memory 56. The programs referred to here are computer programs for executing various types of processing.

The system control unit 50 is a control unit including at least one processor or circuit, and controls the entire digital camera 100. The system control unit 50 realizes each processing by executing programs recorded in the non-volatile memory 56 described above. A system memory 52 is a RAM, for example, and constants and variables for operating the system control unit 50, programs read out from the non-volatile memory 56, and the like are loaded into the system memory 52. The system control unit 50 also performs display control by controlling the memory 32, the image processing unit 24, the memory control unit 15, etc. A system timer 53 is a time measuring unit that measures time used in various types of processing and time of an internal clock.

The mode switching switch 60, the shutter button 61, the operation units 70, and the power switch 72 are used to input various operation instructions to the system control unit 50.

The mode switching switch 60 switches an operation mode of the system control unit 50 to any of a still image recording mode, a moving image capturing mode, a reproduction mode, a communication connection mode, etc. The still image recording mode includes an automatic image capturing mode, an automatic scene determination mode, a manual mode, an aperture priority mode (Av mode), a shutter speed priority mode (Tv mode), and a program AE mode. There are also various scene modes, custom modes, etc., which are image capturing settings for various scenes. The user can directly switch the operation mode to any of these modes by using the mode switching switch 60. Alternatively, a configuration is also possible in which the screen of the display unit 28 is switched to a screen showing a list of image capturing modes with use of the mode switching switch 60, and then the operation mode is selectively switched to any of the plurality of modes displayed in the display unit 28 with use of another operation member. Likewise, the moving image capturing mode may also include a plurality of modes.

The shutter button 61 includes a first shutter switch 62 and a second shutter switch 64. The first shutter switch 62 is turned on in the middle of an operation made on the shutter button 61, i.e., in response to so-called half push (image capturing preparation instruction), and generates a first shutter switch signal SW1. In response to the first shutter switch signal SW1, the system control unit 50 starts image capturing preparation operations such as AF (Auto Focusing) processing, AE (Automatic Exposure) processing, AWB (Automatic White Balance) processing, and EF (pre-flashing) processing. The second shutter switch 64 is turned on in response to completion of the operation made on the shutter button 61, i.e., in response to so-called full push (image capturing instruction), and generates a second shutter switch signal SW2. In response to the second shutter switch signal SW2, the system control unit 50 starts a series of operations of image capturing processing that starts by reading out signals from the imaging units 22*a* and 22*b* and ends by writing image data into a recording medium 90.

Note that the shutter button 61 is not limited to an operation member that can be operated in two stages, i.e., full push and half push, and may also be an operation member that can be pushed only in one stage. In this case, the image capturing preparation operations and the image capturing processing are successively performed in response to a single operation of pushing the shutter button. This operation is the same as a case in which a shutter button that can be half-pushed and full-pushed is full-pushed (a case in which the first shutter switch signal SW1 and the second shutter switch signal SW2 are generated approximately at the same time).

As a result of various function icons or options displayed on the display unit 28 being selectively operated, functions are assigned to the operation units 70 according to each situation, and the operation units 70 function as various function buttons. Examples of the function buttons include an end button, a return button, an image forwarding button, a jump button, a narrowing button, and an attribute change button. For example, when a menu button is pushed, a menu screen via which various settings can be performed is displayed on the display unit 28. The user can perform various settings intuitively by operating the operation units 70 while viewing the menu screen displayed on the display unit 28.

The power switch 72 is a push button for switching the power source on and off. A power source control unit 80 is constituted by a battery detection circuit, a DC-DC converter, and a switching circuit for switching blocks to which power is supplied, for example, and detects the presence or absence of an attached battery, the type of battery, and the remaining battery charge, for example. Also, the power source control unit 80 controls the DC-DC converter based on the detection result and an instruction from the system control unit 50, and supplies a required voltage for a required period of time to each unit including the recording medium 90. A power source unit 30 is constituted by a primary battery such as an alkaline battery or a lithium battery, a secondary battery such as a NiCd battery, a NiMH battery, or a Li battery, an AC adapter, or the like.

A recording medium I/F 18 is an interface between the digital camera and the recording medium 90 such as a memory card or a hard disk. The recording medium 90 is a recording medium, such as a memory card, for recording captured images, and is constituted by a semiconductor memory, an optical disk, a magnetic disk, or the like. The recording medium 90 may be a replaceable recording medium that can be attached to the digital camera 100 and detached therefrom or a built-in recording medium included in the digital camera 100.

The communication unit 54 transmits image signals, audio signals, etc., to an external device connected to the digital camera wirelessly or via a cable, and receives such signals from the external device. The communication unit 54 can also be connected to a wireless LAN (Local Area Network) and the Internet. The communication unit 54 can transmit images (including LV images) captured by the imaging units 22*a* and 22*b* and images recorded in the recording medium 90, and receive images and various types of other information from the external device.

A orientation detection unit 55 detects the orientation of the digital camera 100 relative to the gravitational direction. On the basis of the orientation detected by the orientation detection unit 55, it is possible to determine whether an image captured by the imaging units 22*a* and 22*b* was captured by positioning the digital camera 100 in the landscape orientation or in the portrait orientation. Also, it is possible to determine how much the digital camera 100 was tilted in directions (rotation directions) of three axes, i.e., the yaw direction, the pitch direction, and the roll direction, when the image was captured by the imaging units 22*a* and 22*b*. The system control unit 50 can add direction information corresponding to the orientation detected by the orientation detection unit 55 to an image file of a VR image captured by the imaging units 22*a* and 22*b*, and record an image after rotating the image (adjusting the direction of the image to perform tilt correction (zenith correction)). It is possible to use, as the orientation detection unit 55, an acceleration sensor, a gyro sensor, a geomagnetic sensor, an azimuth sensor, an altitude sensor, or the like, or a combination of any of the plurality of sensors. It is also possible to detect movement of the digital camera 100 (pan, tilt, whether the camera is raised, whether the camera is stationary or not, etc.) with use of the acceleration sensor, the gyro sensor, the azimuth sensor, or the like constituting the orientation detection unit 55.

A microphone 20 collects audio in a surrounding region of the digital camera 100, which is recorded as audio of VR images that are moving images (VR moving images). The connection I/F 25 is a connection plug to which an HDMI (registered trademark) cable, a USB cable, or the like is connected to connect an external device and transmit and receive images.

Figure 2A:
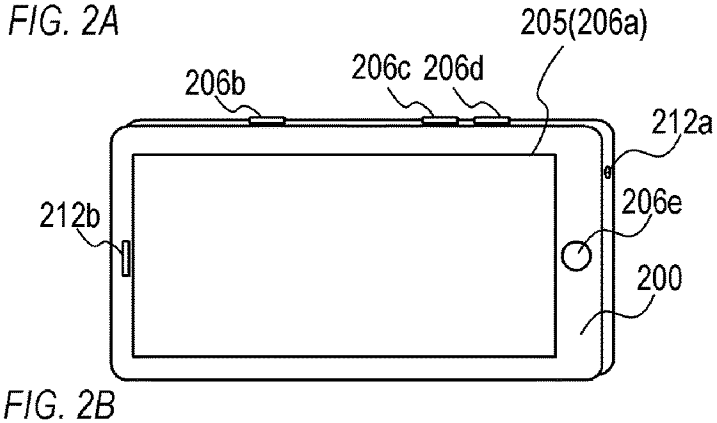
FIG. 2A is an external view of a display control device.

FIG. 2A is an external view of a display control device 200 to which the present invention is applied. The display control device 200 is a display device such as a smartphone, for example. A display 205 is a display unit for displaying images and various types of information. The display 205 is integrated with a touch panel 206*a*, and is configured to be capable of detecting a touch operation made on a display surface of the display 205. The display control device 200 can perform VR displaying of VR images (VR contents) on the display 205. An operation unit 206*b* is a power source button that accepts an operation for switching the power source of the display control device 200 on and off. An operation unit 206*c* and an operation unit 206*d* are volume buttons for increasing or decreasing the volume of audio output from a speaker 212*b* or an earphone or an external speaker connected to an audio output terminal 212*a*. An operation unit 206*e* is a home button for causing the display 205 to display a home screen. The audio output terminal 212*a* is an earphone jack, and is a terminal for outputting audio signals to an earphone or an external speaker, for example. The speaker 212*b* is a built-in speaker included in the body of the display control device to output audio.

Figure 2B:
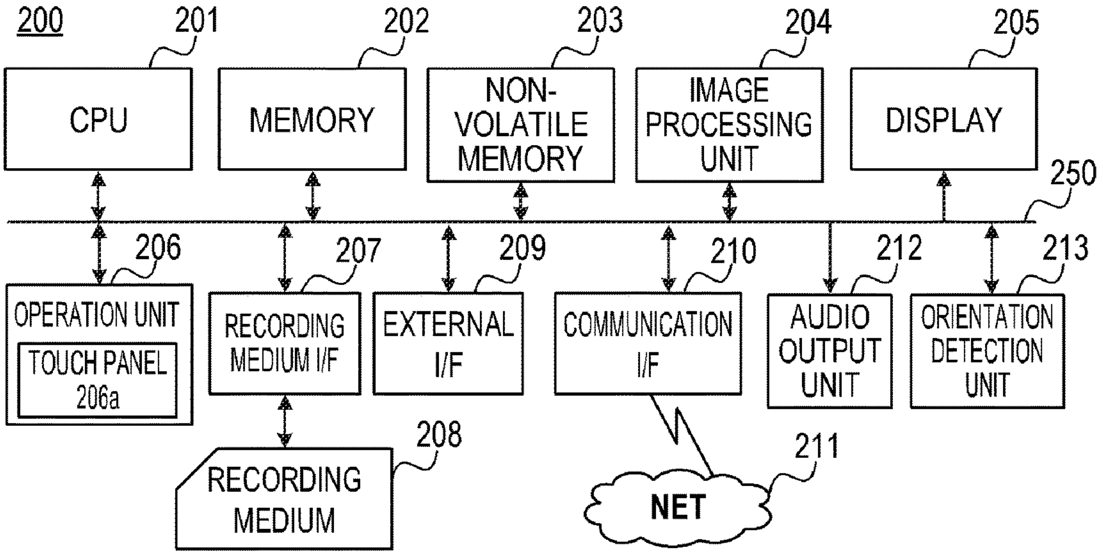
FIG. 2B is a block diagram of the display control device.

FIG. 2B is a block diagram showing a configuration example of the display control device 200. A CPU 201, a memory 202, a non-volatile memory 203, an image processing unit 204, the display 205, the operation units 206, a recording medium I/F 207, an external I/F 209, and a communication I/F 210 are connected to an internal bus 250. An audio output unit 212 and an orientation detection unit 213 are also connected to the internal bus 250. Each unit connected to the internal bus 250 can exchange data with each other via the internal bus 250.

The CPU 201 is a control unit that controls the entire display control device 200 and is constituted by at least one processor or circuit. The memory 202 is constituted by a RAM (e.g., a volatile memory configured using a semiconductor element), for example. The CPU 201 controls each unit of the display control device 200 in accordance with a program stored in the non-volatile memory 203 by using the memory 202 as a work memory, for example. Image data, audio data, other data, and various programs for operating the CPU 201 are stored in the non-volatile memory 203, for example. The non-volatile memory 203 is constituted by a flash memory or a ROM, for example.

The image processing unit 204 performs various types of image processing on images stored in the non-volatile memory 203 and a recording medium 208, image signals obtained via the external I/F 209, and images obtained via the communication I/F 210, for example, based on control performed by the CPU 201. The image processing performed by the image processing unit 204 includes A/D conversion processing, D/A conversion processing, image data encoding processing, compression processing, decoding processing, scaling up/down processing (resizing), noise reduction processing, color conversion processing, etc. The image processing unit also performs various types of image processing including panoramic view development, mapping processing, and conversion of VR images that are omnidirectional images or wide-range images covering a wide range if not omnidirectional. The image processing unit 204 may be constituted by a dedicated circuit block for performing specific image processing. Also, depending on the type of image processing, the image processing may also be performed by the CPU 201 in accordance with a program, without the image processing unit 204 being used.

The display 205 displays images, a GUI screen that constitutes GUI (Graphical User Interface), and the like based on control performed by the CPU 201. The CPU 201 generates display control signals in accordance with a program, and controls each unit of the display control device 200 to generate image signals for displaying images on the display 205 and output the image signals to the display 205. The display 205 displays images based on the image signals that have been generated and output. Note that a configuration is also possible in which the display control device 200 includes an interface for outputting image signals for displaying images on the display 205, and the display 205 is constituted by an externally-attached monitor (a television, a HMD, etc.).

The operation units 206 are input devices for accepting user operations including a text information input device, such as a keyboard, a pointing device, such as a mouse or a touch panel, a button, a dial, a joystick, a touch sensor, a touch pad, etc. In the present embodiment, the operation units 206 include the touch panel 206*a* and the operation units 206*b*, 206*c*, 206*d*, and 206*e*.

The recording medium 208 such as a memory card, a CD, or a DVD can be attached to the recording medium I/F 207 and can be detached therefrom. On the basis of control performed by the CPU 201, the recording medium I/F 207 reads out data from the attached recording medium 208 and writes data into the recording medium 208. The recording medium 208 is a storage unit for storing data such as images to be displayed on the display 205. The external I/F 209 is an interface that is connected to an external device wirelessly or via a cable (e.g., a USB cable) to input and output image signals and audio signals (i.e., perform data communication). The communication I/F 210 is an interface for communicating (performing wireless communication) with an external device, the Internet 211, or the like to transmit and receive various types of data such as files and commands (i.e., perform data communication). The communication I/F 210 can communicate with the communication unit 54 of the digital camera 100 shown in FIGS. 1A to 1C. The display control device 200 can receive images (video) captured by the digital camera 100 and cause the display 205 of the display control device 200 to display the images.

The audio output unit 212 outputs audio of moving images and music data reproduced by the display control device 200, operation sound, ringtone, and various types of notification sound, for example. The audio output unit 212 includes the audio output terminal 212*a*, to which an earphone or the like is connected, and the speaker 212*b*, but the audio output unit 212 may also output audio data to an external speaker via wireless communication, for example.

The orientation detection unit 213 detects the orientation (inclination) of the display control device 200 relative to the gravitational direction and the orientation of the display control device 200 relative to each axis of the yaw direction, the pitch direction, and the roll direction, and notifies the CPU 201 of orientation information. On the basis of the orientation detected by the orientation detection unit 213, it is possible to determine whether the display control device 200 is in the landscape orientation or in the portrait orientation, whether the display control device 200 is facing upward or downward, and whether the display control device 200 is tilted or not, for example. It is also possible to determine whether or not the display control device 200 is tilted in rotation directions such as the yaw direction, the pitch direction, and the roll direction, how much the display control device 200 is tilted in these rotation directions, and whether or not the display control device 200 has rotated in these rotation directions, for example. It is possible to use, as the orientation detection unit 213, an acceleration sensor, a gyro sensor, a geomagnetic sensor, an azimuth sensor, an altitude sensor, or the like, or a combination of any of the plurality of sensors.

As described above, the operation units 206 include the touch panel 206*a*. The touch panel 206*a* is an input device that is configured to be flat and overlaid on the display 205, and output coordinate information corresponding to a touched position. The CPU 201 can detect the following states or operations made on the touch panel 206*a*.

- The touch panel 206*a* is newly touched by a finger or a pen that has not touched the touch panel 206*a*, i.e., the start of touching (hereinafter referred to as "Touch-Down").
- A state where the touch panel 206*a* is being touched by a finger or a pen (hereinafter referred to as "Touch-On").
- A finger or a pen is moving while touching the touch panel 206*a* (hereinafter referred to as "Touch-Move").
- A finger or a pen that has been touching the touch panel 206*a* is removed from the touch panel 206*a*, i.e., the end of touching (hereinafter referred to as "Touch-Up").
- A state where the touch panel 206*a* is not touched by anything (hereinafter referred to as "Touch-Off").

Touch-On is detected simultaneously with Touch-Down. Unless Touch-Up is detected after Touch-Down, usually, Touch-On is kept detected. Touch-On is also detected simultaneously with Touch-Move. Even if Touch-On is detected, Touch-Move is not detected unless the touched position changes. Touch-Off is detected when Touch-Up is detected for all fingers or pens that have been touching the touch panel.

The CPU 201 is notified of these operations or states and coordinates of a position on the touch panel 206*a* that is touched by a finger or a pen, via the internal bus, and the CPU 201 determines the operation (touch operation) made on the touch panel 206*a* based on the given information. As for Touch-Move, the direction in which the finger or pen is moving on the touch panel 206*a* can also be determined with respect to each of a vertical component and a horizontal component on the touch panel 206*a*, based on changes in the coordinates of the touched position. When Touch-Move is detected for at least a predetermined distance, it is determined that a slide operation has been performed.

An operation made by quickly moving a finger over a certain distance while touching the touch panel 206*a* with the finger, and then removing the finger from the touch panel is called flicking. In other words, flicking is an operation of quickly sliding the finger along the touch panel 206*a* and then moving the finger up. When Touch-Move performed over at least a predetermined distance with at least a predetermined speed is detected and subsequently Touch-Up is detected, it can be determined that flicking has been performed (it can be determined that flicking has been performed subsequently to a slide operation).

Furthermore, a touch operation made by simultaneously touching a plurality of points (e.g., two points) and moving the touching fingers closer to each other is called "pinch-in", and a touch operation made by simultaneously touching a plurality of points and moving the touching fingers away from each other is called "pinch-out". Pinch-in and pinch-out are collectively referred to as "pinch operations" (or simply, pinching). The touch panel 206*a* may use any of various technologies such as a resistive film technology, an electrostatic capacity technology, a surface acoustic wave technology, an infrared ray technology, an electromagnetic induction technology, an image recognition technology, an optical sensor technology, etc. There are technologies for detecting a touch in response to something coming into contact with the touch panel and technologies for detecting a touch in response to a finger or a pen approaching the touch panel, and either of these technologies can be used.

Figure 2C:
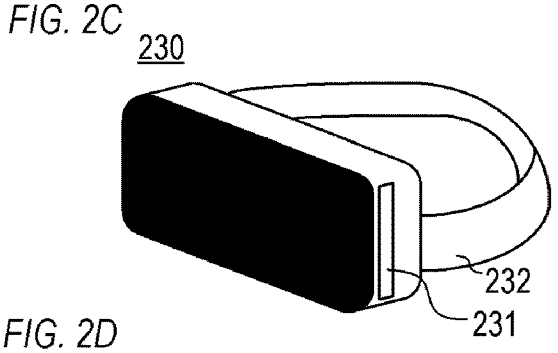
FIG. 2C is an external view of VR goggles.

FIG. 2C is an external view of VR goggles (head-mounted adapter) 230 to which the display control device 200 can be attached. The display control device 200 can be attached to the VR goggles 230 and used as a head-mounted display. An insertion slot 231 is a slot for inserting the display control device 200. The entire display control device 200 can be inserted into the VR goggles 230 with the display surface of the display 205 facing a head band 232 for fixing the VR goggles 230 to the head of the user (i.e., facing the user side). The user can view the display 205 without holding the display control device 200 with his hand while wearing the VR goggles 230, to which the display control device 200 has been attached, on his head. In this case, when the user moves his head or entire body, the orientation of the display control device 200 also changes. At this time, the orientation detection unit 213 detects the change in the orientation of the display control device 200, and the CPU 201 performs processing for VR displaying based on the change in the orientation. In this case, detecting the orientation of the display control device 200 by the orientation detection unit 213 is equivalent to detecting the orientation of the head of the user (the direction of a line of sight of the user). Note that the display control device 200 itself may be an HMD that can be worn on the head without the need to use VR goggles.

Figure 2D:
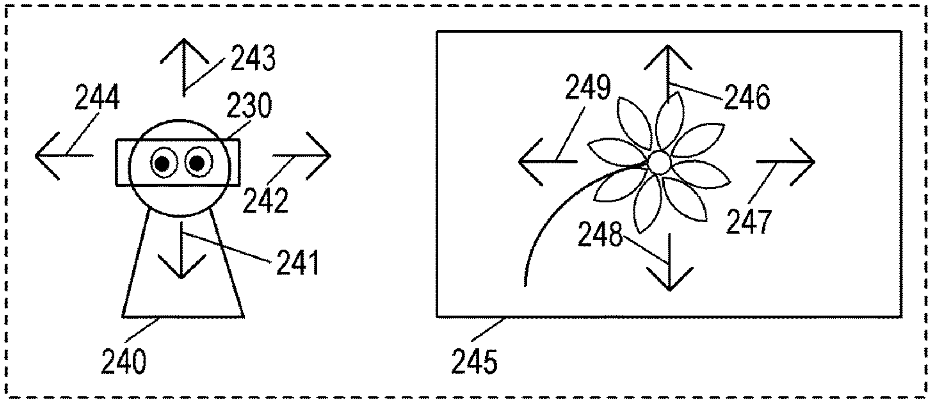
FIG. 2D is a schematic diagram showing VR displaying.

FIG. 2D shows an example of VR displaying of the case where the user wears the VR goggles 230 to which the display control device 200 has been attached. It is assumed that, when a person 240 wearing the VR goggles 230 is looking ahead (the front side of the sheet), the person 240 sees VR display 245 displayed by the display control device 200. The VR display 245 shows a flower. When the person 240 moves his head downward as indicated by the arrow 241, the flower shown in the VR display 245 appears as if it moves upward as indicated by the arrow 246. Likewise, when the person 240 rotates his head leftward as indicated by the arrow 242, moves his head upward as indicated by the arrow 243, and rotates his head rightward as indicated by the arrow 244, the flower shown in the VR display 245 appears as if it moves rightward as indicated by the arrow 247, downward as indicated by the arrow 248, and leftward as indicated by the arrow 249, respectively. As described above, when the user is wearing the VR goggles 230, the CPU 201 changes the displayed range of VR display in response to a change in the orientation of the user.

Figure 3A:
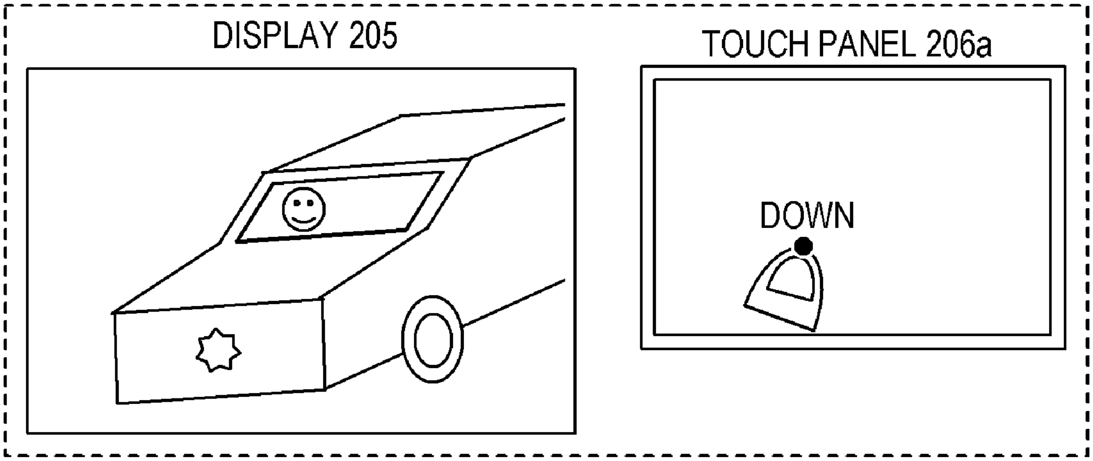
FIGS. 3A to 3C are schematic diagrams showing a touch operation for changing a displayed range.
Figure 3B:
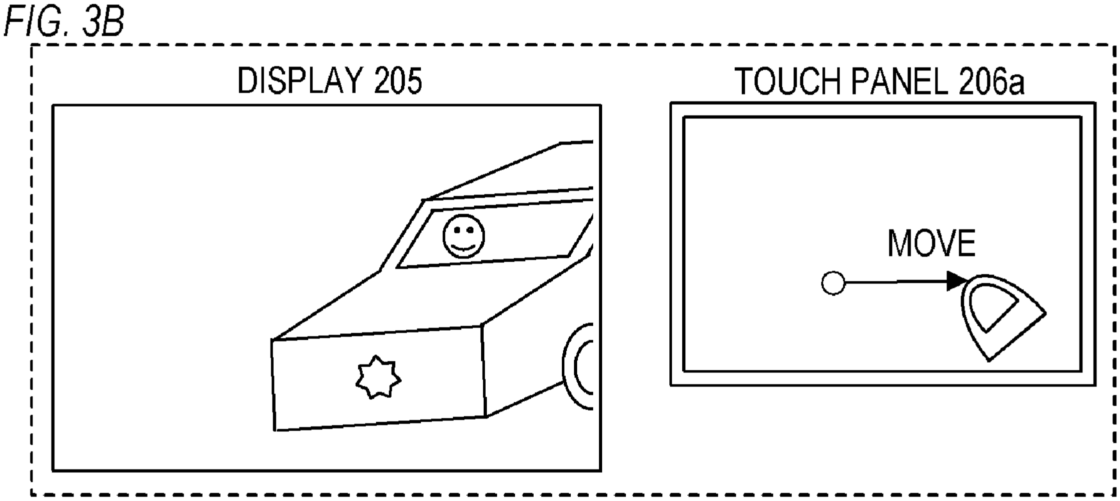
Figure 3C:
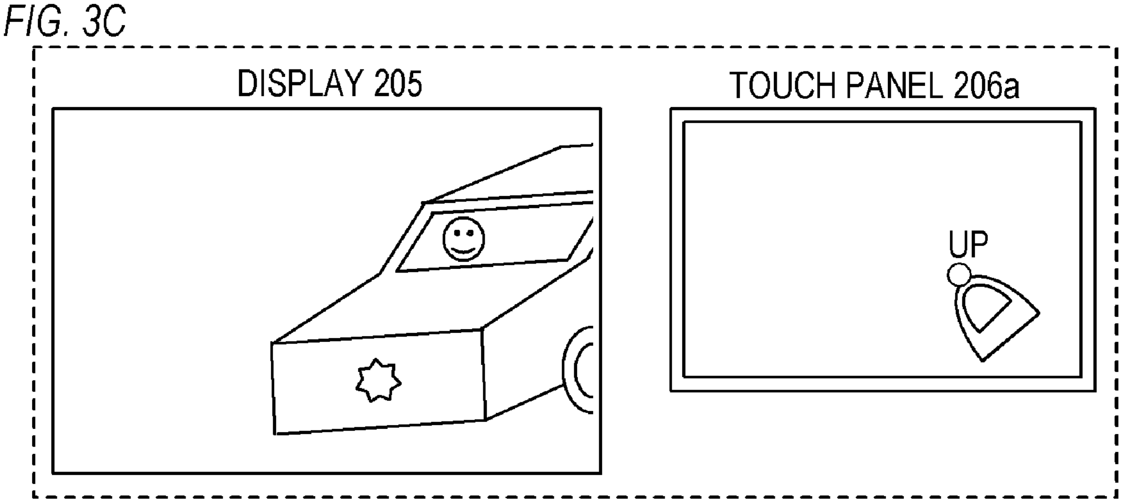

As a method for changing the displayed range of VR display, it is also possible to use a method in which the orientation of the user is not detected. FIGS. 3A to 3C show an example in which the displayed range is changed in response to touch operations without the orientation of the user being detected. First, as shown in FIG. 3A, the CPU 201 detects a Touch-Down operation on the touch panel 206*a*. The CPU 201 does not change the displayed range of VR display in response to the Touch-Down operation. Next, as shown in FIG. 3B, the CPU 201 detects a Touch-Move operation on the touch panel 206*a*. At this time, the CPU 201 moves the displayed range of VR display in such a manner that the wide-range image (VR image) moves (slides) in a movement direction by a movement amount corresponding to the Touch-Move operation. The movement direction of the wide-range image (direction opposite to a movement direction of the displayed range) is the same as the movement direction of the Touch-Move operation, and the movement amount of the wide-range image (movement amount of the displayed range) is proportional to the movement amount of the Touch-Move operation. Lastly, as shown in FIG. 3C, the CPU 201 detects a Touch-Up operation from the touch panel 206*a*. The CPU 201 does not change the displayed range of VR display in response to the Touch-Up operation. This method does not require no device such as VR goggles.

Figure 4:
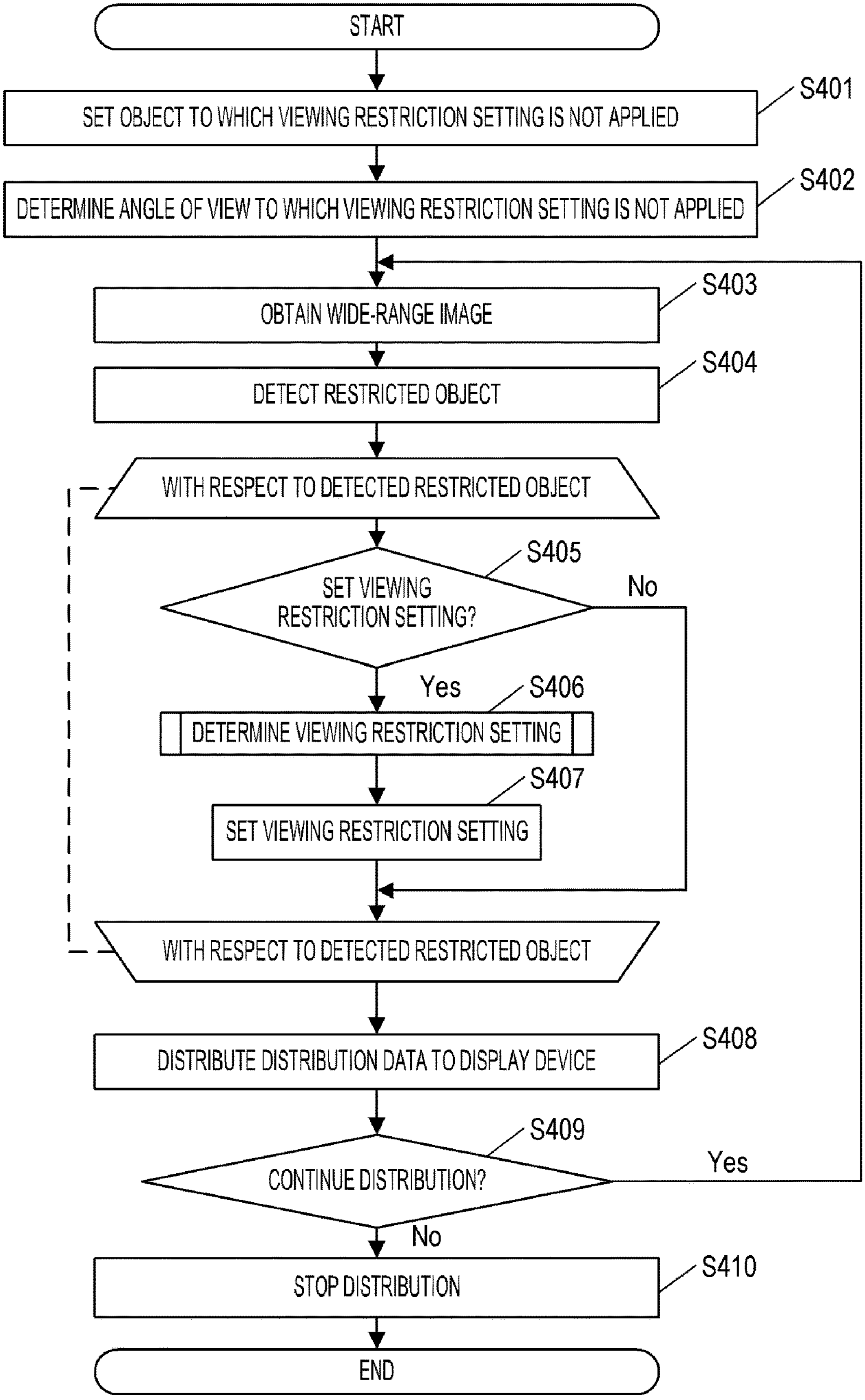
FIG. 4 is a flowchart showing distribution processing performed by the digital camera.

The following describes a flow of distribution processing performed by the digital camera 100 with reference to the flowchart shown in FIG. 4. The distribution processing shown in FIG. 4 is realized as a result of the system control unit 50 loading a program stored in the non-volatile memory 56 into the system memory 52 and executing the program. The system control unit 50 starts the distribution processing shown in FIG. 4 in response to a distribution start instruction given from the user, for example. Note that the following describes an example in which live streaming is performed, but images (video) do not necessarily need to be distributed by means of live streaming.

Figure 5A:
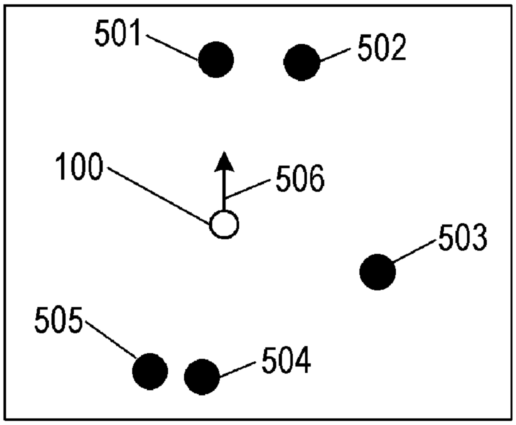
FIG. 5A is a schematic diagram showing a positional relationship between objects around the digital camera.
Figure 5B:
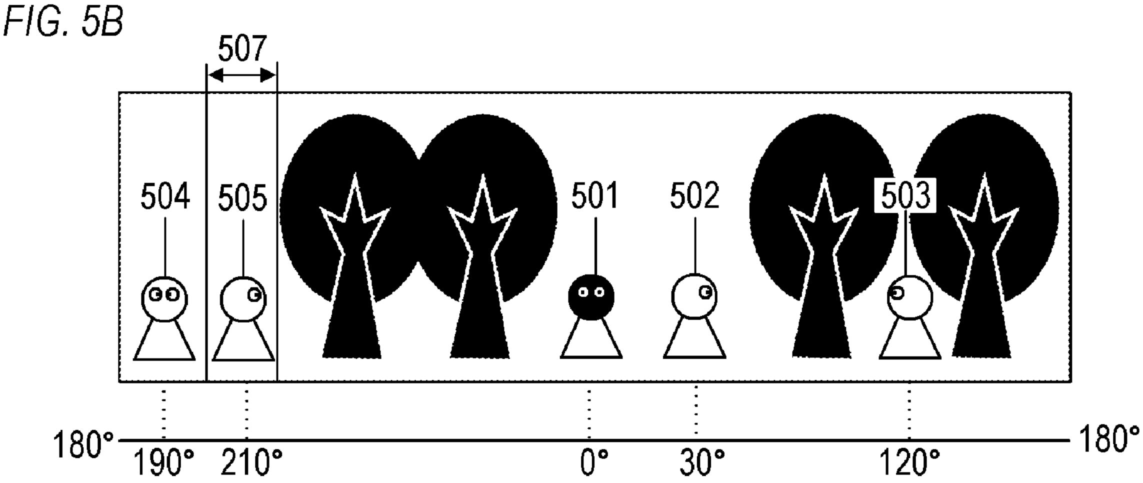
FIG. 5B is a schematic diagram showing a wide-range image.

FIG. 5A shows an example of a positional relationship between objects around the digital camera 100 at the time when a wide-range image is captured by the digital camera 100. FIG. 5A shows the positional relationship as viewed from above. There are persons 501 to 505 around the digital camera 100, and an image of them is captured by the digital camera 100. Objects other than those people are omitted. It is assumed that the digital camera 100 is positioned in such a manner that an optical axis of the taking lens 103*a* and an optical axis of the taking lens 103*b* extend horizontally. A reference direction 506 of the digital camera 100 is a direction toward the center of an image capturing range in front of the digital camera 100 (the direction in which the optical axis of the taking lens 103*a* is directed). When the wide-range image captured in the state shown in FIG. 5A is developed by means of equidistant cylindrical projection, an image shown in FIG. 5B is obtained.

In step S401, the system control unit 50 sets an object indicated by the user of the digital camera 100 (who captured the image or distributes the image) as an object for which viewing restriction settings (settings for restricting viewing of the distributed image (video) by viewers) are not applied. The user may indicate an object or a plurality of objects. The user may indicate the object by capturing an image of the object after setting a particular mode of the digital camera 100, for example. Alternatively, the user may indicate the object by inserting the recording medium 90, in which an image including the object has been recorded, into the digital camera 100, causing the system control unit 50 to detect objects in the image, and selecting the particular object among the detected objects, for example. When the user of the digital camera 100 wants to show his face to viewers, for example, the user can indicate his face. Thus, it is possible to prevent the viewing restriction settings from being applied to the face of the user of the digital camera 100. Here, it is assumed that only the person 501 shown in FIG. 5B is set as the object for which the viewing restriction settings are not applied.

In step S402, the system control unit 50 determines an angle of view (a specific range of the wide-range image in a predetermined direction (horizontal direction)) in which the viewing restriction settings are not applied to objects, in response to a user operation. The system control unit 50 may determine a single angle of view or a plurality of angles of view as the angle of view in which the viewing restriction settings are not applied to objects. The user operation may be an operation made on a setting screen of the digital camera 100 to set an angle of view captured by the lens 103*a* as the angle of view in which the viewing restriction settings are not applied to objects, for example. Alternatively, the user operation may be an operation made on the setting screen of the digital camera 100 to input a suitable angle selected from 1° to 180°. When 45° is input, for example, the system control unit 50 determines the angle 45° on both the left side and the right side of a specific object (e.g., the object set in step S401), i.e., a total angle of 90° as the angle of view in which the viewing restriction settings are not applied to objects. It is also possible to determine an angle of view of which the center is in the reference direction 506 shown in FIG. 5A, rather than an angle of view of which the center is at the specific object. The digital camera 100 may be installed in a live show venue. In this case, if it is apparent that performers of the live show will be included in a certain angle of view of the digital camera 100, the user of the digital camera 100 may set the angle of view as the angle of view in which the viewing restriction settings are not applied to objects. Thus, it is possible to prevent the viewing restriction settings from being applied to the performers.

In step S403, the system control unit 50 obtains a wide-range image by controlling the imaging units 22*a* and 22*b*, for example.

In step S404, the system control unit 50 detects a restricted object in the wide-range image obtained in step S403. The restricted object is a specific object for which viewing of the distributed image (video) by viewers should be restricted. The restricted object is detected by pattern matching in which a trained model obtained through machine learning is used, for example. Note that the restricted object may be indicated by the user of the digital camera 100. For example, in the case where the digital camera 100 includes a display and a touch panel superposed on the display, an object displayed on the display and touched by the user may be set as the restricted object.

The restricted object detected in step S404 is an object for which there is a risk of infringing rights of someone if the object is included in the distributed image, for example. Specific examples of the restricted object include a third party whom the person who captured the image has never met and someone's works included in an advertisement exhibited on the street. If these are included in the distributed image, portrait rights and privacy rights may be infringed in the former case, and copyright may be infringed in the latter case. The restricted object may also be an object for which age limits are set on viewing of its image, such as a smoking person and a gravure image. Such objects for which viewing of their images should be restricted for only some viewers may also be set as restricted objects. For example, from a legal standpoint, viewing of an image of a smoking person should be restricted for only viewers of a particular nationality at particular ages, but the system control unit 50 may set a smoking person as a restricted object in step S404. For viewers for whom it is determined that there is no need to restrict viewing based on conditions such as nationality and age, it is possible to cancel the viewing restriction settings set for the restricted object, in processing described later with reference to FIG. 8.

The system control unit 50 performs processing in steps S405 to S407 with respect to each restricted object detected in step S404. At this time, it is possible to randomly select a restricted object as the processing target, but the processing target does not necessarily need to be randomly selected. For example, restricted objects may be selected in the order starting from a restricted object that is the farthest from the object set in step S401 in the wide-range image (in the descending order of the absolute value of a difference between a location angle (azimuth angle) of the object set in step S401 and a location angle of each restricted object). When the processing in steps S405 to S407 has been performed with respect to all restricted objects, the processing proceeds to step S408.

In step S405, the system control unit 50 determines whether or not to set a viewing restriction setting for the restricted object that is the processing target. When it is determined to set a viewing restriction setting, the processing proceeds to step S406, otherwise the processing in steps S405 to S407 ends with respect to the restricted object that is the processing target. If the restricted object is the object set in step S401 or an object included in the angle of view determined in step S402, the system control unit 50 determines not to set a viewing restriction setting. Otherwise, the system control unit 50 determines to set a viewing restriction setting.

It is assumed that, in step S401, the person 501 shown in FIG. 5B was set as an object for which the viewing restriction settings are not applied, and in step S402, no angle of view was determined as an angle of view in which the viewing restriction settings are not applied to objects. Then, in step S404, the persons 501 to 505 were detected as restricted objects. In this case, it is determined to set a viewing restriction setting for each of the persons 502 to 505.

In step S406, the system control unit 50 performs determination processing for determining a viewing restriction setting to be applied to the restricted object that is the processing target. Details of the determination processing for determining the viewing restriction setting will be described later with reference to FIG. 6.

In step S407, the system control unit 50 sets the viewing restriction setting determined in step S406 for the restricted object that is the processing target (i.e., makes the setting effective).

In step S408, the system control unit 50 distributes distribution data including the wide-range image and information regarding each restricted object (identification information, a region, the location angle, a location angle of view, the viewing restriction setting, etc.) to a display device (e.g., the display control device 200) of a viewer. Details of processing performed by the display device will be described later with reference to FIG. 8.

In step S409, the system control unit 50 determines whether or not to continue the distribution based on a user operation. When the distribution is to be continued, the processing proceeds to step S403, otherwise the processing proceeds to step S410.

In step S410, the system control unit 50 stops the distribution.

Figure 6:
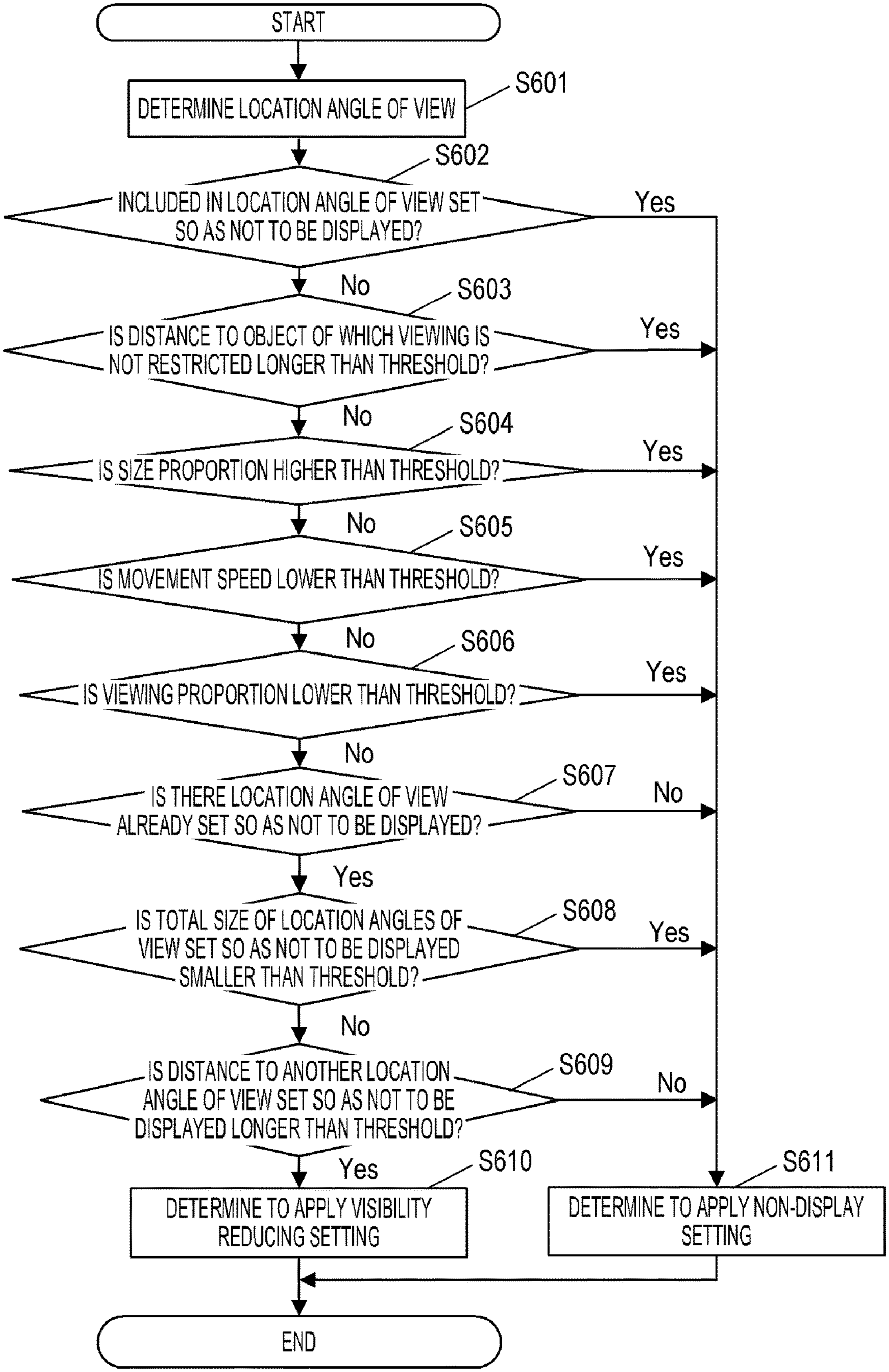
FIG. 6 is a flowchart showing viewing restriction setting determination processing.

FIG. 6 shows a flowchart of the determination processing (step S406 in FIG. 4) for determining a viewing restriction setting. In the determination processing shown in FIG. 6, the system control unit selectively executes either: processing in which it is determined to apply a setting (non-display setting) so as not to display the location angle of view of the restricted object; or processing in which it is determined to apply a setting (visibility reducing setting) to perform image processing for reducing visibility of the restricted object. Examples of the image processing for reducing visibility include pixelation and blurring. The former processing is performed in step S611, and the latter processing is performed in step S610.

Figures 7A, 7B, 7C:
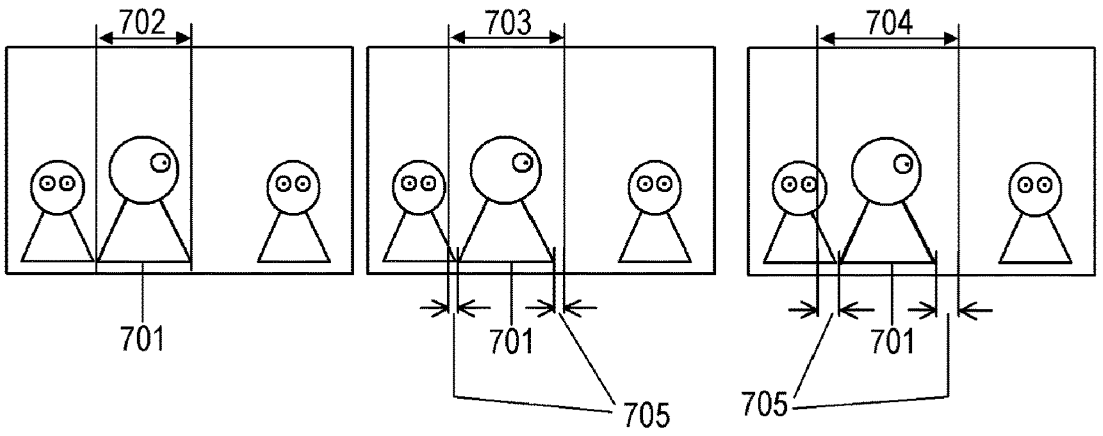
FIGS. 7A to 7C are schematic diagrams showing a location angle of view of an object.

In step S601, the system control unit 50 determines a range including the restricted object that is the processing target in a predetermined direction (horizontal direction) in the wide-range image, as the location angle of view of the restricted object. For example, a minimum angle of view 702 including a person 701 who is the restricted object may be determined as the location angle of view of the person 701 as shown in FIG. 7A, or an angle of view 703 or an angle of view 704 wider than the angle of view 702 may be determined as the location angle of view of the person 701 as shown in FIGS. 7B and 7C. A width 705 between the azimuth angle of an end of the restricted object (end of the angle of view 702) and the azimuth angle of an end of the location angle of view may be common to all restricted objects or may be changed according to the restricted object. For example, a configuration is possible in which the lower the degree of accuracy (reliability) of a detection result of the restricted object is, the wider the width 705 becomes, or the higher the movement speed of the restricted object in the wide-range image is, the wider the width 705 becomes. Also, the width 705 at the right end of the location angle of view may differ from the width 705 at the left end of the location angle of view. For example, when the restricted object is moving rightward in the wide-range image, the width 705 on the right side of the restricted object may be determined to be wider than the width 705 on the left side of the restricted object.

In step S602, the system control unit 50 determines whether or not the restricted object that is the processing target is included in the location angle of view of another restricted object for which it has already been determined to set the non-display setting. When the restricted object that is the processing target is included in the location angle of view of the other restricted object, the processing proceeds to step S611, otherwise the processing proceeds to step S603. Here, it is possible to determine whether or not the entire restricted object that is the processing target is included in the location angle of view of the other restricted object, or determine whether or not at least a part of the restricted object that is the processing target is included in the location angle of view of the other restricted object. It is also possible to determine whether or not at least a predetermined proportion of the restricted object that is the processing target is included in the location angle of view of the other restricted object.

In step S603, the system control unit 50 determines whether or not a distance in the horizontal direction between the restricted object that is the processing target and the object set in step S401 is longer than a threshold in the wide-range image. When the distance is longer than the threshold, the processing proceeds to step S611, otherwise the processing proceeds to step S604. Here, the distance in the horizontal direction between two objects in a wide-range image corresponds to the absolute value of a difference between the location angle (azimuth angle) of one of the objects and the location angle of the other object. The system control unit 50 may make the determination based on a presumption that the object set in step S401 is located in the reference direction of the digital camera 100. For example, in the situation shown in FIG. 5B (i.e., in step S401, the person 501 was set as an object for which viewing restriction settings are not applied), it is determined whether or not a distance to the person 501 and the location angle 0° of the reference direction 506 is longer than the threshold. In a case where a plurality of objects were set in step S401 as objects for which viewing restriction settings are not applied, it may be determined whether or not a distance to an object that is the closest to the restricted object that is the processing target among the plurality of objects is longer than the threshold.

Here, two values one of which is 180° or less and the other is 180° or more are obtained as the absolute value of the difference between the location angle of the restricted object that is the processing target and the location angle of the object set in step S401. The smaller value (180° or less) of these two values (a clockwise angle and a counterclockwise angle) is compared with the threshold. For example, when the processing in step S603 is performed with respect to the person 505 shown in FIG. 5B, 150° and 210° are obtained as the absolute value of the difference between the location angle 210° of the person 505 and the location angle 0° of the person 501. In step S603, the system control unit 50 determines whether or not 150° is larger than the threshold.

In step S604, the system control unit 50 calculates a proportion of the size of a region of the restricted object that is the processing target to the size of a region corresponding to the location angle of view of the restricted object in the wide-range image, and determines whether or not the proportion is higher than a threshold. When the calculated proportion is higher than the threshold, the processing proceeds to step S611, otherwise the processing proceeds to step S605. For example, when the processing in step S604 is performed with respect to the person 505 shown in FIG. 5B, whether or not a proportion of the size of a region of the person 505 to the size of a region corresponding to the location angle of view 507 of the person 505 is higher than the threshold is determined. When viewing of a large proportion of a specific angle of view is restricted in accordance with the visibility reducing setting, an object that the viewer wants to view is unlikely to be included in the angle of view. In such a case, it is often desirable for the viewer not to display the angle of view, from the standpoint of operability, which will be described later with reference to FIGS. 10A and 10B, for example. Therefore, when the proportion calculated in step S604 is higher than the threshold, the processing proceeds to step S611. When location angles of view of a plurality of restricted objects including the restricted object that is the processing target overlap with each other or are close to each other, it is also possible to calculate a proportion of the total size of regions of the plurality of restricted objects to the size of a region corresponding to an angle of view including the location angles of view of the plurality of restricted objects. The angle of view including the location angles of view of the plurality of restricted objects is, for example, a range from the smallest azimuth angle to the largest azimuth angle of the location angles of view of the plurality of restricted objects.

In step S605, the system control unit 50 calculates a movement speed of the restricted object that is the processing target in the horizontal direction in the wide-range image, and determines whether or not the movement speed is lower than a threshold. When the movement speed is lower than the threshold, the processing proceeds to step S611, otherwise the processing proceeds to step S606.

In step S606, the system control unit 50 calculates a proportion of the number of viewers viewing the restricted object that is the processing target to the number of all viewers viewing the distributed image, and determines whether or not the proportion is lower than a threshold. When the calculated proportion is lower than the threshold, the processing proceeds to step S611, otherwise the processing proceeds to step S607. It is possible to calculate the number of all viewers viewing the distributed image and the number of viewers viewing the restricted object that is the processing target, based on signals received from display devices of the viewers, for example. For example, whether or not a viewer is viewing the person 505 (angle of view 507) shown in FIG. 5B can be determined on the basis of whether or not the angle of view 507 is displayed at the center of a display surface of the display device (e.g., the center of the display surface of the display 205) of the viewer. Note that, instead of the above-described proportion, it is also possible to calculate a proportion of the number of viewers viewing the restricted object that is the processing target to the number of viewers included in a small group of viewers extracted from all viewers viewing the distributed image.

In step S607, the system control unit 50 determines whether or not there is any restricted object for which it has already been determined to set the non-display setting (whether or not there is any location angle of view that has already been set so as not to be displayed). When it is determined that there is a restricted object for which it has already been determined to set the non-display setting, the processing proceeds to step S608, otherwise the processing proceeds to step S611.

In step S608, the system control unit 50 determines whether or not a total size of location angles of view (not including overlapping portions) of restricted objects for which it has already been determined to set the non-display setting is smaller than a threshold. When the total size (total angle) is smaller than the threshold, the processing proceeds to step S611, otherwise the processing proceeds to step S609. Note that it is also possible to determine whether or not a sum of location angles of view of all restricted objects for which it has already been determined to set the non-display setting and the location angle of view of the restricted object that is the processing target is smaller than the threshold.

In step S609, the system control unit 50 determines whether or not a distance in the horizontal direction between the location angle of view of a restricted object for which it has already been determined to set the non-display setting and the restricted object that is the processing target is longer than a threshold in the wide-range image. Although there is no particular limitation on the definition of the distance, the threshold is compared with, for example, a distance in the horizontal direction between an end of the location angle of view of the restricted object for which it has already been determined to set the non-display setting and the restricted object that is the processing target. For example, the threshold is compared with the absolute value of a difference (the smaller one of two values) between the azimuth angle corresponding to the end of the location angle of view of the restricted object for which it has already been determined to set the non-display setting and the location angle of the restricted object that is the processing target. When the distance is longer than the threshold, the processing proceeds to step S610, otherwise the processing proceeds to step S611. A configuration is also possible in which the processing proceeds to step S611 only when the location angle of view of the restricted object that is the processing target is adjacent to or partially overlaps with the location angle of view of another restricted object for which it has already been determined to set the non-display setting.

In step S610, the system control unit 50 determines to apply the visibility reducing setting, as the viewing restriction setting, to the restricted object that is the processing target.

In step S611, the system control unit 50 determines to apply the non-display setting, as the viewing restriction setting, to the restricted object that is the processing target.

Note that the various thresholds used in the determination processing shown in FIG. 6 may be fixed values that are determined in advance, values that are calculated by the system control unit 50 individually for each restricted object, or values set in response to input from the user.

Figure 8:
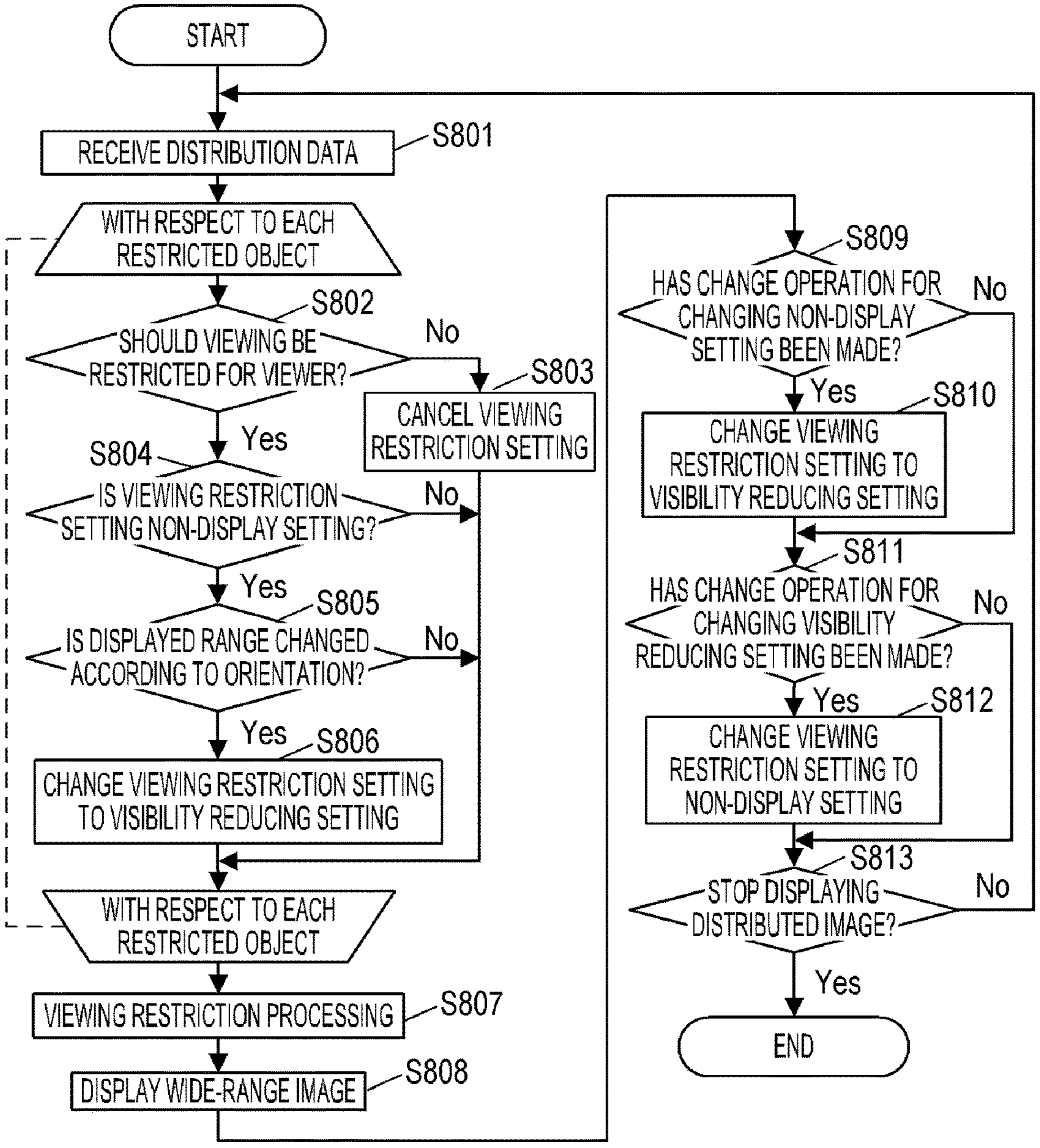
FIG. 8 is a flowchart showing display processing performed by the display control device.

The following describes a flow of display processing performed by the display control device 200 to display distributed images (distributed video) with reference to the flowchart shown in FIG. 8. The display processing shown in FIG. 8 is realized as a result of the CPU 201 loading a program stored in the non-volatile memory 203 into the memory 202 and executing the program. The CPU 201 starts the processing shown in FIG. 8 in response to a viewing start instruction given from a viewer, for example.

In step S801, the CPU 201 receives, via the communication I/F 210, distribution data distributed from the digital camera 100 in step S408. The distribution data includes a wide-range image and information regarding each restricted object (identification information, the region, the location angle, the location angle of view, the viewing restriction setting, etc.).

The CPU 201 performs processing in steps S802 to S806 with respect to each restricted object for which a viewing restriction setting has been set. When the processing in steps S802 to S806 has been performed with respect to all restricted objects for which a viewing restriction setting has been set, the processing proceeds to step S807.

In step S802, the CPU 201 determines whether or not viewing of an image of the restricted object that is the processing target should be restricted for the viewer using the display control device 200. When viewing should be restricted, the processing proceeds to step S804, otherwise the processing proceeds to step S803. This determination is made using account information associated with the display control device 200 in an application for viewing distributed images, for example. The account information used here is personal information such as the age and nationality, for example. For example, the system control unit 50 may detect a smoking person as a restricted object in step S404 shown in FIG. 4. However, viewers for whom viewing of an image of a smoking person should be restricted are limited to viewers of a specific nationality in a specific age group. In step S802, the CPU 201 refers to the account information of the viewer, and when the viewer is not a viewer of the specific nationality in the specific age group, the CPU 201 may determine that there is no need to restrict viewing of the image of the smoking person (restricted object) and proceed to step S803.

In step S803, the CPU 201 cancels the viewing restriction setting (makes the setting ineffective) set for the restricted object that is the processing target, and ends the processing in steps S802 to S806 with respect to the restricted object that is the processing target. Information (information indicating cancellation, ineffectiveness) of the changed viewing restriction setting is stored in the memory 202 in association with the restricted object, and may be reflected in distribution data received in step S801 for the next time.

In step S804, the CPU 201 determines whether or not the viewing restriction setting set for the restricted object that is the processing target is the non-display setting. When the setting is the non-display setting, the processing proceeds to step S805, otherwise (when the setting is the visibility reducing setting) the processing in steps S802 to S806 ends with respect to the restricted object that is the processing target.

In step S805, the CPU 201 determines whether or not a setting for changing a range (displayed range) of the wide-range image in response to a change in the orientation of the display control device 200 has been set in the display control device 200. When such a setting has been set, the processing proceeds to step S806, otherwise the processing in steps S802 to S806 ends with respect to the restricted object that is the processing target. For example, the processing proceeds to step S806 in a case where the display control device 200 is attached to the VR goggles 230 shown in FIG. 2C and the displayed range is changed on the basis of a detection result of the orientation of the head of the viewer. The processing in steps S802 to S806 ends with respect to the restricted object that is the processing target in a case where the user does not use the VR goggles 230 and the display control device 200 changes the displayed range in response to a touch operation such as the operation shown in FIGS. 3A to 3C.

In step S806, the CPU 201 changes the viewing restriction setting set for the restricted object that is the processing target from the non-display setting to the visibility reducing setting. It is thought that, when some angle of view in the wide-range image is not displayed, the viewer feels the image more unnatural in the case where the displayed range is changed in response to a change in the orientation of the viewer, when compared with the case where the displayed range is not changed in this way. The processing performed in step S806 can make the image less likely to appear unnatural. As described above, information of the changed viewing restriction setting is stored in the memory 202 in association with the restricted object, and may be reflected in distribution data received in step S801 for the next time.

In step S807, the CPU 201 performs viewing restriction processing (hiding, pixelation, blurring, etc.) on the wide-range image to restrict viewing of the restricted object in accordance with the viewing restriction setting set for each restricted object.

In step S808, the CPU 201 displays the wide-range image subjected to the viewing restriction processing on the display 205.

Figure 9A:
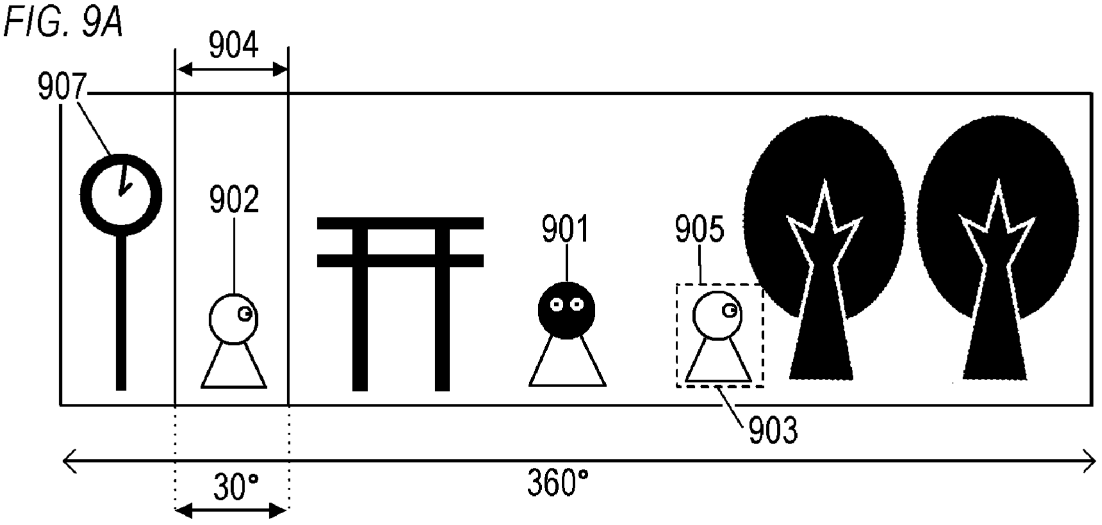
FIGS. 9A to 9C are schematic diagrams showing wide-range images.

FIG. 9A is a schematic diagram showing a wide-range image prior to being subjected to the viewing restriction processing in step S807. Here, a person 901 is an object (an object for which the viewing restriction settings are not made effective) set in step S401 shown in FIG. 4. A person 902 is a restricted object detected in step S404, an angle of view 904 has been determined as the location angle of view of the person 902 in step S601 shown in FIG. 6, and the non-display setting has been made effective for the person 902 (angle of view 904) in step S407. Here, the angle of view 904 is 30°. A person 903 is a restricted object detected in step S404, and the visibility reducing setting has been made effective for the person 903 in step S407. Here, it is assumed that the viewing restriction settings set for the persons 902 and 903 have not been made ineffective in step S803, and it has been determined in step S805 that the setting for changing the displayed range of the wide-range image in response to a change in the orientation has not been set.

Figure 9B:
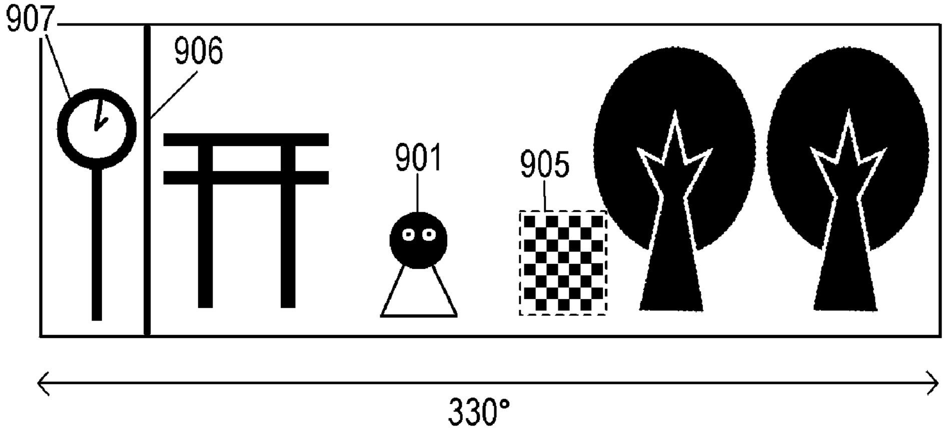

FIG. 9B is a schematic diagram showing the wide-range image after the viewing restriction processing is performed in step S807. In step S808, the wide-range image shown in FIG. 9B is displayed, for example. The angle of view 904 shown in FIG. 9A is not displayed in accordance with the non-display setting set for the person 902, and therefore, the wide-range image is displayed in such a manner that both ends of the angle of view 904 are connected. That is, the viewer views a wide-range image having a whole angle of view of 330°, rather than the wide-range image having a whole angle of view of 360° as shown in FIG. 9A. At this time, a straight line 906 or the like may be displayed at the position corresponding to the angle of view 904 to make it possible to recognize that the angle of view 904 is not displayed. A region 905 is the region of the person 903 shown in FIG. 9A. The region 905 is pixelated in accordance with the visibility reducing setting set for the person 903.

In step S809, the CPU 201 determines whether or not a change operation has been performed to change the viewing restriction setting for a restricted object from the non-display setting to the visibility reducing setting. When the change operation has been performed, the processing proceeds to step S810, otherwise the processing proceeds to step S811. The change operation referred to here is an operation for displaying an angle of view that is not displayed, for example, by performing Touch-Down at the position corresponding to the straight line 906 shown in FIG. 9B on the touch panel **206*a*** and then performing Touch-Up.

Figure 9C:
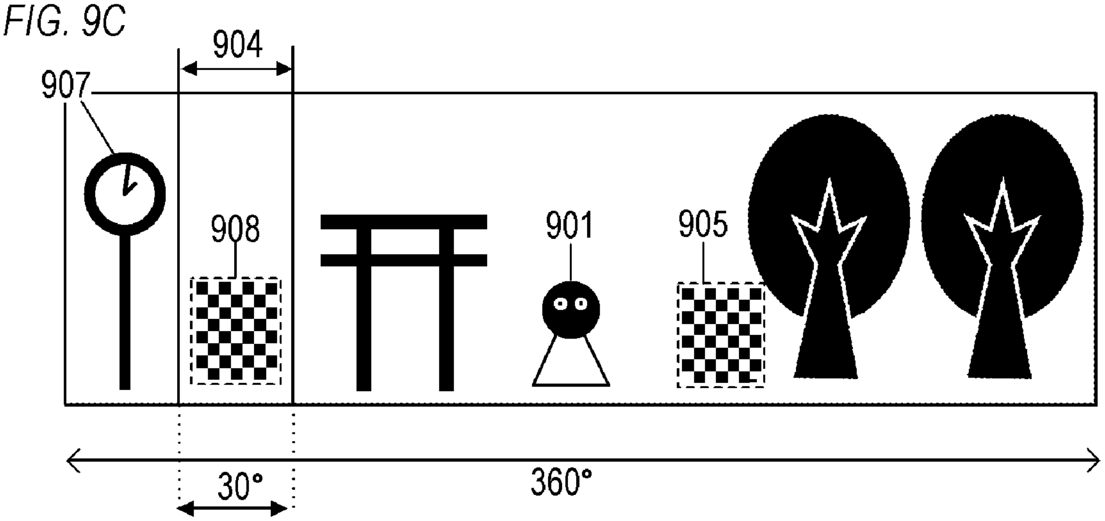

In step S810, the CPU 201 changes the viewing restriction setting set for the restricted object from the non-display setting to the visibility reducing setting in response to the change operation detected in step S809, and updates the displayed wide-range image. FIG. 9C is a schematic diagram showing the wide-range image displayed when the viewing restriction setting for the person 902 is changed from the non-display setting to the visibility reducing setting in the situation shown in FIG. 9B. The angle of view 904, which is not displayed in FIG. 9B, is displayed, and a region 908 of the person 902 is pixelated in accordance with the visibility reducing setting. In order to make it easy for the viewer to distinguish between the angle of view displayed in step S810 (angle of view not displayed in step S808) and the other angles of view, or for any other purpose, hatching processing or the like may be performed on the angle of view displayed in step S810. Also, at this time, a text describing the reason why the object was detected as the restricted object may be displayed near the restricted object for which the visibility reducing setting is applied, for example. As described above, information of the changed viewing restriction setting is stored in the memory 202 in association with the restricted object, and may be reflected in distribution data received in step S801 for the next time.

In step S811, the CPU 201 determines whether or not a change operation has been performed to change the viewing restriction setting for a restricted object from the visibility reducing setting to the non-display setting. When it is determined that the change operation has been performed, the processing proceeds to step S812, otherwise the processing proceeds to step S813. The change operation referred to here is an operation for again hiding the angle of view displayed in step S810 in response to the change operation performed in step S809, for example, by performing Touch-Down at the position corresponding to the angle of view 904 shown in FIG. 9C on the touch panel 206*a* and then performing Touch-Up. A configuration is also possible in which the viewing restriction setting for an object that was initially the visibility reducing setting (an object pixelated in step S808) can be changed from the visibility reducing setting to the non-display setting.

In step S812, the CPU 201 changes the viewing restriction setting set for the restricted object from the visibility reducing setting to the non-display setting in response to the change operation detected in step S811, and updates the displayed wide-range image. As described above, information of the changed viewing restriction setting is stored in the memory 202 in association with the restricted object, and may be reflected in distribution data received in step S801 for the next time.

In step S813, the CPU 201 determines whether or not to stop displaying the distributed image. When displaying the distributed image is to be stopped, the display processing shown in FIG. 8 ends, otherwise the processing proceeds to step S801.

As described above, according to the present embodiment, the viewing restriction settings are set for specific objects included in a distributed wide-range image, and viewing of the specific objects is restricted in accordance with the viewing restriction settings. Therefore, when a specific object is included in a distributed wide-range image against the intention of the person who distributed the image, it is possible to restrict viewing of the image of the specific object for viewers. This can reduce a risk of the person distributing the image infringing portrait rights and privacy rights due to a third party being included in the image or infringing the copyright due to someone's works being included in the image.

Furthermore, according to the present embodiment, it is possible to reduce the possibility of a viewer viewing a restricted object by hiding an angle of view including the restricted object. For example, when viewing of an image of a restricted object is restricted by performing image processing such as pixelation or blurring, there is a risk that the viewer will be able to discern the restricted object depending on the degree of processing. Also, when the restricted object is detected through pattern matching or the like, the accuracy of detection is not necessarily high. For example, there is a risk that the restricted object may be detected with a size smaller than its actual size, and when the movement speed of the restricted object is high, there is a risk that a position different from the actual position of the restricted object may be detected as the position of the restricted object. Therefore, in the determination processing shown in FIG. 6, the location angle of view of a restricted object is not displayed when the method of hiding the location angle of view is particularly effective (in cases where the above-described various risks are high) and when effectiveness of the image processing for reducing visibility is low.

Figure 10A:
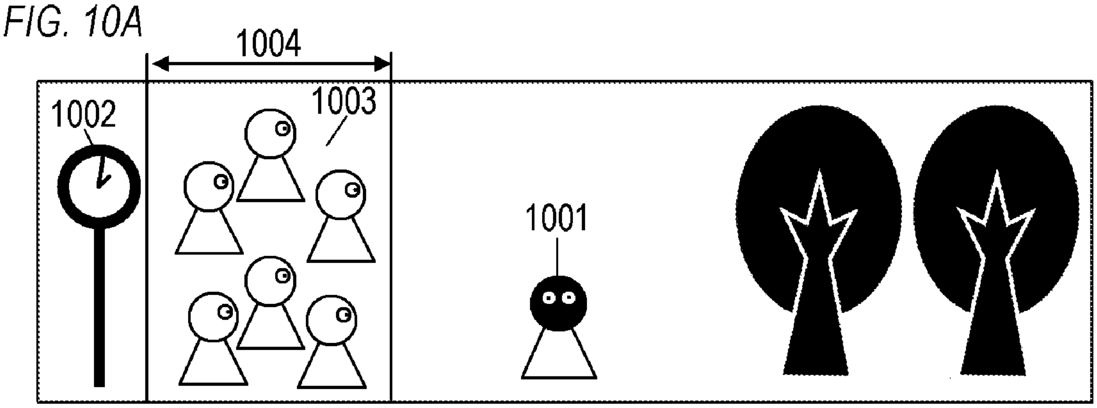
FIGS. 10A and 10B are schematic diagrams showing wide-range images.
Figure 10B:
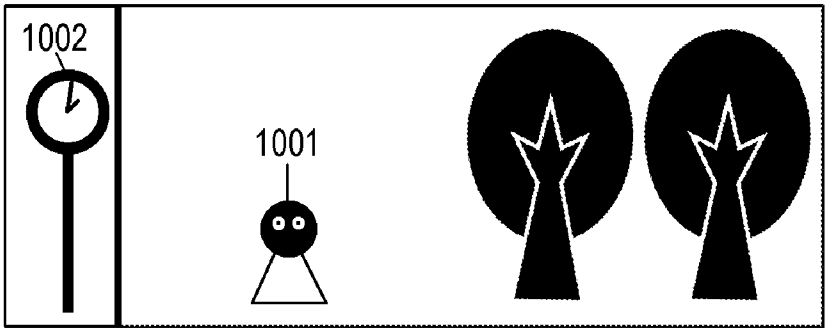

Also, it is possible to improve operability for the viewer by hiding the location angle of view of a restricted object. FIG. 10A shows a wide-range image before location angles of view of restricted objects are hidden. Here, there is a group of people 1003 (a plurality of persons) who are restricted objects and whose location angles of view partially overlap with each other between a person 1001 who is an object set in step S401 (an object for which the viewing restriction settings are not made effective) and a clock 1002. When pixelation or the like is performed on all people included in the group of people 1003, pixelation or the like is performed on the most part of an angle of view 1004. In such a case, when the displayed range of the wide-range image is changed in response to an instruction from the viewer, the operability is high for the viewer if the angle of view 1004 is not displayed. For example, it is assumed that the clock 1002 shown in FIGS. 10A and 10B is displayed and the person 1001 is not displayed on the display 205. In such a case, in order to display the person 1001, the viewer needs to change the displayed range of the wide-range image through a touch operation like that shown in FIGS. 3A to 3C. At this time, if the angle of view 1004 is hidden as shown in FIG. 10B, it is possible to display the person 1001 through Touch-Move performed over a short distance, compared with the case (FIG. 10A) where the angle of view 1004 is not hidden.

According to the present embodiment, the viewer can change the viewing restriction setting set for a restricted object, but a configuration is also possible in which the viewer cannot change the viewing restriction setting set for a restricted object. In such a case, the digital camera 100 (the system control unit 50) may perform the viewing restriction processing and distribute or save the wide-range image subjected to the viewing restriction processing. For example, the digital camera 100 (the system control unit 50) may hide the location angle of view of a restricted object and distribute or save a wide-range image having a whole angle of view less than 360°. In this case, it is possible to prevent the viewer from viewing the image of the restricted object against the intention of the person who distributed the image. Accordingly, this method is effective when the person who distributed the image does not want the viewer to view the image of the restricted object.

An angle of view that is not displayed may be eliminated from the wide-range image or replaced with a dummy image. In a case where a distribution site to which it is difficult or impossible to post an image (a still image or a moving image) having an angle of view less than 360° is used, the digital camera 100 (the system control unit 50) may use a dummy image to post a wide-range image having a whole angle of view of 360° to the distribution site. The dummy image may be an image captured in advance (e.g., an image of the hidden angle of view, in which the restricted object is not included), but does not necessarily need to be such an image (e.g., may also be a black image). It is also possible to display a text indicating that the angle of view is not displayed or a text describing the reason why the angle of view is not displayed, in association with the angle of view to make it possible to recognize that the angle of view is not displayed.

Note that the various types of control described above as control performed by the system control unit 50 may be performed by a single piece of hardware, or may be performed by a plurality of pieces of hardware to control the entire device. The same also applies to the various types of control described above as control performed by the CPU 201.

Although the present invention has been described in detail based on a preferred embodiment, the present invention is not limited to the particular embodiment, and encompasses various embodiments not departing from the gist of the present invention. The above-described embodiment is merely one embodiment of the present invention, and it is possible to combine embodiments of the present invention as appropriate.

In the above-described embodiment, a case is described as an example in which the present invention is applied to an image capturing device (a digital camera) and a display control device, but there is no limitation to this example, and the present invention can be applied to an electronic device that can obtain wide-range images. For example, the present invention can be applied to a personal computer, a PDA, a mobile phone terminal, a portable image viewer, a printer device, a digital photo frame, a music player, a game console, an electronic book reader, etc. Also, the present invention can be applied to a video player, a display device (including a projection device), a tablet terminal, a smartphone, an AI speaker, a home electric appliance, a vehicle-mounted device, etc.

Also, the present invention can be applied not only to the main body of an image capturing device, but also to a control device that communicates with the image capturing device (including a network camera) wirelessly or via a cable, and performs remote control of the image capturing device. Examples of devices for performing remote control of the image capturing device include a smartphone, a tablet PC, and a desktop PC. It is possible to perform remote control of the image capturing device by giving commands for realizing various operations and settings of the image capturing device from the control device based on operations made on the control device or processing performed by the control device. A configuration is also possible in which a live view image captured by the image capturing device can be received by the control device through wired or wireless communication, and displayed by the control device.

According to the present invention, it is possible to sufficiently hide an object (make the object invisible).

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-076793, filed on May 8, 2023, which is hereby incorporated by reference herein in its entirety.

What is claimed is:

1. An electronic device comprising:

a processor; and a memory storing a program which, when executed by the processor, causes the electronic device to:

(1) obtain an image, (2) detect a specific object from the image, (3) determine a range corresponding to an angle of view including the detected specific object in the image, and (4) selectively execute either of setting processing for hiding the range of the image and setting processing for performing image processing to reduce visibility of the range of the image, depending on a state of the specific object, wherein in a case where the range of the image is hidden, the image is displayed such that both ends of the range are connected to each other, wherein the state of the specific object is a size of a region, in the image, of the specific object, wherein in a case where a ratio of (1) the size of the region, in the image, of the specific object to (2) a size of a region, in the image, corresponding to the angle of view of the range is greater than a threshold value, the range of the image is hidden, and wherein in a case where the ratio is less than the threshold value, the visibility of the range of the image is reduced.

2. The electronic device according to claim 1, wherein the image processing is pixelation.

3. The electronic device according to claim 1, wherein the image processing is blurring.

4. The electronic device according to claim 1, wherein, in a case where the specific object is included in another range that has already been set so as to be hidden, the range of the image is set so as to be hidden.

5. The electronic device according to claim 1, wherein, in a case where a distance between an object indicated by a user and the specific object is longer than a threshold, the range of the image is set so as to be hidden.

6. The electronic device according to claim 1, wherein, in a case where a proportion of a size of a region of the specific object to a size of a region corresponding to the range including the specific object is higher than a threshold, the range of the image is set so as to be hidden.

7. The electronic device according to claim 1, wherein, in a case where a movement speed of the specific object is lower than a threshold, the range is set so as to be hidden.

8. The electronic device according to claim 1, wherein, in a case where a proportion of a number of viewers viewing the specific object to a number of all viewers is lower than a threshold, the range is set so as to be hidden.

9. The electronic device according to claim 1, wherein, in a case where a distance between another range that has already been set so as to be hidden and the specific object is shorter than a threshold, the range including the specific object is set so as to be hidden.

10. The electronic device according to claim 1, wherein a range including an object indicated by a user is not set so as to be hidden.

11. The electronic device according to claim 1, wherein a specific range of the image is not set so as to be hidden.

12. A control method of an electronic device, the control method comprising:

obtaining an image;

detecting a specific object from the image;

determining a range corresponding to an angle of view including the detected specific object in the image; and selectively executing either of setting processing for hiding the range of the image and setting processing for performing image processing to reduce visibility of the range of the image, depending on a state of the specific object, wherein in a case where the range of the image is hidden, the image is displayed such that both ends of the range are connected to each other, wherein the state of the specific object is a size of a region, in the image, of the specific object, wherein in a case where a ratio of (1) the size of the region, in the image, of the specific object to (2) a size of a region, in the image, corresponding to the angle of view of the range is greater than a threshold value, the range of the image is hidden, and wherein in a case where the ratio is less than the threshold value, the visibility of the range of the image is reduced.

13. A non-transitory computer-readable medium that stores a program, wherein the program causes a computer to execute a control method of an electronic device, the control method comprising:

obtaining an image;

detecting a specific object from the image;

determining a range corresponding to an angle of view including the detected specific object in the image; and selectively executing either of setting processing for hiding the range of the image and setting processing for performing image processing to reduce visibility of the range of the image, depending on a state of the specific object, wherein in a case where the range of the image is hidden, the image is displayed such that both ends of the range are connected to each other, wherein the state of the specific object is a size of a region, in the image, of the specific object, wherein in a case where a ratio of (1) the size of the region, in the image, of the specific object to (2) a size of a region, in the image, corresponding to the angle of view of the range is greater than a threshold value, the range of the image is hidden, and wherein in a case where the ratio is less than the threshold value, the visibility of the range of the image is reduced.

14. The electronic device according to claim 1, wherein the state of the specific object is a distance in a horizontal direction between the specific object and an object indicated by a user, wherein in a case where the distance in the horizontal direction is longer than a threshold, the range of the image is hidden, and wherein in a case where the distance in the horizontal direction is shorter than the threshold, the visibility of the range of the image is reduced.

15. An electronic device comprising:

a processor; and a memory storing a program which, when executed by the processor, causes the electronic device to:

(1) obtain an image, (2) detect a specific object from the image, (3) determine a range corresponding to an angle of view including the detected specific object in the image, and (4) selectively execute either of setting processing for hiding the range of the image and setting processing for performing image processing to reduce visibility of the range of the image, depending on a state of the specific object, wherein in a case where the range of the image is hidden, the image is displayed such that both ends of the range are connected to each other, wherein the state of the specific object is a movement speed of the specific object in the horizontal direction, wherein in a case where the movement speed in the horizontal direction is lower than a threshold value, the range of the image is hidden, and wherein in a case where the movement speed in the horizontal direction is higher than the threshold value, the visibility of the range of the image is reduced.

16. A control method of an electronic device, the control method comprising:

obtaining an image;

detecting a specific object from the image;

determining a range corresponding to an angle of view including the detected specific object in the image; and selectively executing either of setting processing for hiding the range of the image and setting processing for performing image processing to reduce visibility of the range of the image, depending on a state of the specific object, wherein in a case where the range of the image is hidden, the image is displayed such that both ends of the range are connected to each other, wherein the state of the specific object is a movement speed of the specific object in the horizontal direction, wherein in a case where the movement speed in the horizontal direction is lower than a threshold value, the range of the image is hidden, and wherein in a case where the movement speed in the horizontal direction is higher than the threshold value, the visibility of the range of the image is reduced.

17. A non-transitory computer-readable medium that stores a program, wherein the program causes a computer to execute a control method of an electronic device, the control method comprising:

obtaining an image;

detecting a specific object from the image;

determining a range corresponding to an angle of view including the detected specific object in the image; and selectively executing either of setting processing for hiding the range of the image and setting processing for performing image processing to reduce visibility of the range of the image, depending on a state of the specific object, wherein in a case where the range of the image is hidden, the image is displayed such that both ends of the range are connected to each other, wherein the state of the specific object is a movement speed of the specific object in the horizontal direction, wherein in a case where the movement speed in the horizontal direction is lower than a threshold value, the range of the image is hidden, and wherein in a case where the movement speed in the horizontal direction is higher than the threshold value, the visibility of the range of the image is reduced.

* * * * *